(12) United States Patent
Kitahara et al.

(10) Patent No.: US 8,737,806 B2
(45) Date of Patent: May 27, 2014

(54) REPRODUCTION DEVICE AND REPRODUCTION METHOD

(75) Inventors: Yohei Kitahara, Tokyo (JP); Yoshiaki Kusunoki, Tokyo (JP); Masaaki Shimada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 91 days.

(21) Appl. No.: 13/125,056

(22) PCT Filed: Nov. 4, 2009

(86) PCT No.: PCT/JP2009/005851
§ 371 (c)(1),
(2), (4) Date: Apr. 20, 2011

(87) PCT Pub. No.: WO2010/055624
PCT Pub. Date: May 20, 2010

(65) Prior Publication Data
US 2011/0200299 A1 Aug. 18, 2011

(30) Foreign Application Priority Data

Nov. 13, 2008 (JP) ................................ 2008-290728
Mar. 18, 2009 (JP) ................................ 2009-066031

(51) Int. Cl.
*H04N 9/80* (2006.01)
(52) U.S. Cl.
USPC ............................ 386/241; 386/239; 386/248
(58) Field of Classification Search
USPC .................. 386/239–248, 343–352
See application file for complete search history.

(56) References Cited

U.S. PATENT DOCUMENTS

| | | | |
|---|---|---|---|
| 6,388,961 | B1 | 5/2002 | Ijichi |
| 6,393,201 | B1 * | 5/2002 | Sakuramoto et al. ......... 386/240 |
| 2003/0223321 | A1 * | 12/2003 | Watanabe .................. 369/30.24 |
| 2006/0120692 | A1 * | 6/2006 | Fukuta ............................. 386/95 |
| 2007/0206923 | A1 * | 9/2007 | Murakoshi et al. ............. 386/95 |
| 2009/0279867 | A1 * | 11/2009 | Hamada et al. ................. 386/96 |

FOREIGN PATENT DOCUMENTS

| | | |
|---|---|---|
| CN | 1070758 A | 4/1993 |
| CN | 1790528 A | 6/2006 |
| JP | 4-349270 A | 12/1992 |
| JP | 11-273224 | 10/1999 |
| JP | 11-273227 | 10/1999 |
| JP | 2000-331466 | 11/2000 |
| JP | 2002-252826 A | 9/2002 |
| JP | 2002-281447 | 9/2002 |
| JP | 2004-206784 A | 7/2004 |
| JP | 2005-302226 A | 10/2005 |

(Continued)

*Primary Examiner* — Hung Dang
(74) *Attorney, Agent, or Firm* — Birch, Stewart, Kolasch & Birch, LLP.

(57) ABSTRACT

A reproduction device (100) includes: a resume information generation unit (121) which generates first resume information (R1) indicating a reproduction stop operation position and second resume information (R2) indicating a reproduction position at one or more of the following moments: upon switching of the reproduction operation type, upon switching of the reproduction information title and/or the chapter, and at regularly spaced reproduction time intervals; a resume information acquisition unit (123) which acquires the first resume information (R1); and a resume information automatic acquisition means (124) which acquires the second resume information (R2). Upon resume reproduction, the reproduction stop operation position indicated by the first resume information (R1) or the reproduction position indicated by the second resume information (R2) is selected, so that the reproduction is resumed at the selected position.

22 Claims, 16 Drawing Sheets

(56) References Cited

FOREIGN PATENT DOCUMENTS

| | | |
|---|---|---|
| JP | 2005-332515 A | 12/2005 |
| JP | 2006-139846 | 6/2006 |
| JP | 2007-135157 A | 5/2007 |
| JP | 2008-98772 A | 4/2008 |
| TW | 412736 B | 11/2000 |
| WO | WO 2006/059483 A1 * | 6/2006 ............. G11B 27/10 |
| WO | WO 2008/056409 A1 | 5/2008 |

* cited by examiner

FIG. 3A
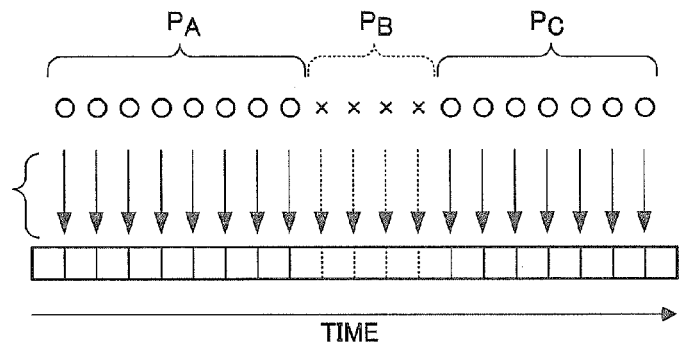
FIG. 3B
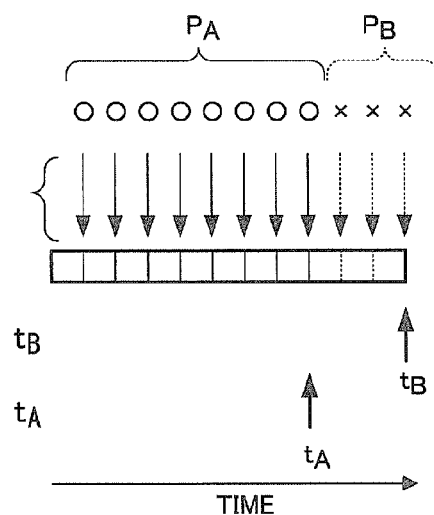
FIG. 4
| RESUME INFORMATION RECORDED IN STORAGE UNIT | | | |
|---|---|---|---|
| TITLE NUMBER | CHAPTER NUMBER | REPRODUCTION TIME (HR:MIN) | RESUME NUMBER |
| 5 | 2 | 10:30 | 1 |
| 3 | 4 | 15:45 | 2 |
| 2 | 1 | 2:30 | 3 |
| TopMenu | | 0:00 | 4 |

FIG. 7A

| RESUME INFORMATION ACQUIRED BY RESUME INFORMATION ACQUISITION UNIT (WHEN ACQUIRABLE) | | | |
|---|---|---|---|
| TITLE NUMBER | CHAPTER NUMBER | REPRODUCTION TIME (HR:MIN) | RESUME NUMBER |
| 5 | 2 | 9:30 | |

| RESUME INFORMATION ACQUIRED BY RESUME INFORMATION AUTOMATIC ACQUISITION UNIT | | | |
|---|---|---|---|
| TITLE NUMBER | CHAPTER NUMBER | REPRODUCTION TIME (HR:MIN) | RESUME NUMBER |
| 5 | 2 | 10:00 | 1 |
| 3 | 4 | 15:45 | 2 |
| 2 | 1 | 2:30 | 3 |
| TopMenu | | 0:00 | 4 |

FIG. 7B

| RESUME INFORMATION ACQUIRED BY RESUME INFORMATION ACQUISITION UNIT (WHEN NOT ACQUIRABLE) | | | |
|---|---|---|---|
| TITLE NUMBER | CHAPTER NUMBER | REPRODUCTION TIME (HR:MIN) | RESUME NUMBER |
| - | - | - | |

| RESUME INFORMATION ACQUIRED BY RESUME INFORMATION AUTOMATIC ACQUISITION UNIT | | | |
|---|---|---|---|
| TITLE NUMBER | CHAPTER NUMBER | REPRODUCTION TIME (HR:MIN) | RESUME NUMBER |
| 5 | 2 | 10:00 | 1 |
| 3 | 4 | 15:45 | 2 |
| 2 | 1 | 2:30 | 3 |
| TopMenu | | 0:00 | 4 |

| RESUME INFORMATION RECORDED IN STORAGE UNIT | | | | |
|---|---|---|---|---|
| TITLE NUMBER | CHAPTER NUMBER | REPRODUCTION TIME (HR:MIN) | RESUME NUMBER | ACQUISITION MEANS |
| 5 | 2 | 10:30 | 1 | USER OPERATION |
| 3 | 4 | 15:45 | 2 | FEATURE POINT CHANGE ACQUISITION |
| 2 | 1 | 2:30 | 3 | CHAPTER CHANGE |
| TopMenu | | 0:00 | 4 | TITLE CHANGE |

FIG. 18A

| INFORMATION FROM RESUME INFORMATION ACQUISITION UNIT 1223 | | | | |
|---|---|---|---|---|
| TITLE NUMBER | CHAPTER NUMBER | REPRODUCTION TIME (HR:MIN) | RESUME NUMBER | ACQUISITION MEANS |
| 5 | 2 | 9:30 | | USER OPERATION |
| 5 | 2 | 9:57 | | FEATURE POINT CHANGE ACQUISITION |

FIG. 18B

| INFORMATION FROM RESUME INFORMATION AUTOMATIC ACQUISITION UNIT 1224 | | | | |
|---|---|---|---|---|
| TITLE NUMBER | CHAPTER NUMBER | REPRODUCTION TIME (HR:MIN) | RESUME NUMBER | ACQUISITION MEANS |
| 5 | 2 | 10:00 | 1 | TIME ACQUISITION |
| 3 | 4 | 15:45 | 2 | GOP CHANGE |
| 2 | 1 | 2:30 | 3 | CHAPTER CHANGE |
| TopMenu | | 0:00 | 4 | TITLE CHANGE |

FIG. 18C

| INFORMATION FROM RESUME INFORMATION ACQUISITION UNIT 1223 | | | | |
|---|---|---|---|---|
| TITLE NUMBER | CHAPTER NUMBER | REPRODUCTION TIME (HR:MIN) | RESUME NUMBER | ACQUISITION MEANS |
| – | – | – | – | – |

FIG. 18D

| INFORMATION FROM RESUME INFORMATION AUTOMATIC ACQUISITION UNIT 1224 | | | | |
|---|---|---|---|---|
| TITLE NUMBER | CHAPTER NUMBER | REPRODUCTION TIME (HR:MIN) | RESUME NUMBER | ACQUISITION MEANS |
| 5 | 2 | 10:00 | 1 | TIME ACQUISITION |
| 3 | 4 | 15:45 | 2 | GOP CHANGE |
| 2 | 1 | 2:30 | 3 | CHAPTER CHANGE |
| TopMenu | | 0:00 | 4 | TITLE CHANGE | ns
REPRODUCTION DEVICE AND REPRODUCTION METHOD

FIELD OF THE INVENTION

The present invention relates to a reproduction device and a reproduction method for reproducing video and/or audio.

BACKGROUND ART

In an optical disc reproduction device proposed in, for example, patent document 1, when the user performs an operation that stops reproduction from an optical disc, a resume function stores the time information of the data read from the disc in a memory, and later, if a resume operation is performed to restart reproduction, the resume function restarts reproduction from a position on the optical disc based on the time information stored in the memory.

In an optical disc reproduction device proposed in, for example, patent document 2, when the user performs an operation to stop video reproduction, a resume function writes reproduction stop position information on an HDD, and when reproduction resumes, the resume function reads the stored reproduction stop position information from the HDD and restarts video reproduction from a reproduction stop position selected by the user.

Patent document 1: Japanese Patent Application Publication No. 4-349270 (abstract, FIGS. 1 and 6)
Patent document 2: Japanese Patent Application Publication No. 2004-206784 (abstract, paragraphs 0023-0025, FIGS. 1-3)

SUMMARY OF THE INVENTION

Problem to be Solved by the Invention

A problem with the reproduction devices in the prior art above is that when the user does not perform a reproduction stop operation, or when the reproduction stop operation is performed in a non-resumable interval that is not permitted to be a reproduction start position, even if an operation to start (resume) reproduction is performed later, reproduction cannot restart from the position at which the reproduction stop operation was performed.

The present invention addresses this problem with the object of providing a reproduction device and reproduction method that can resume reproduction by restarting from the reproduction stop operation position, or even when reproduction cannot be restarted from that position, can restart reproduction from a position based on stored resume information.

Means for Solving the Problem

A reproduction device according to the present invention has a reproduction means for reproducing an audio-video signal, a user operation means for input of user commands, a resume function means for managing reproduction start positions, and a control means for controlling the user operation means and the resume function means; the resume function means includes a resume information generation means for generating first resume information indicating a reproduction stop operation position at a moment of a command that stops reproduction given by the user operation means and one or more items of second resume information indicating a reproduction position at one or more moments of switching of reproduction operation type, moments of switching of reproduced information, or moments spaced at regular reproduction time intervals, a storage means, a first resume information acquisition means for acquiring the first resume information and storing it in the storage means, and a second resume information acquisition means for acquiring the one or more items of second resume information and storing them in the storage means; the control means has means for selecting a position from among the reproduction stop operation position indicated by the first resume information and the reproduction positions indicated by the one or more items of second resume information, and causing the reproduction means to restart reproduction from the selected position.

A reproduction method according to the present invention in a reproduction device having a reproduction means for reproducing an audio-video signal, a user operation means for input of user commands, a resume function means for managing reproduction start positions, and a control means for controlling the user operation means includes a step of generating first resume information indicating a reproduction stop operation position at a moment of a command that stops reproduction given by the user operation means and one or more items of second resume information indicating a reproduction position at one or more moments of switching of reproduction operation type, moments of switching of reproduced information, or moments spaced at regular reproduction time intervals, a step of acquiring the first resume information and storing it in a storage means, a step of acquiring the one or more items of second resume information and storing them in the storage means, and a step of selecting a position from among the reproduction stop operation position indicated by the first resume information and the reproduction positions indicated by the one or more items of second resume information, and causing the reproduction means to restart reproduction from the selected position.

Another reproduction device according to the present invention includes a means for reading audio-video data from a recording medium, an audio-video reproduction means for carrying out reproduction processing of the audio-video data, a resume information recording means for storing information indicating a resume point and information related thereto as resume information, a resume information acquisition means for, when reproduction processing execution is suspended in response to a reproduction processing suspension command given by a user operation during the reproduction processing execution, acquiring information indicating a point at which the reproduction processing was suspended as the information indicating a resume point and storing it in the resume information recording means, together with the information related thereto, as manual resume information, a means for analyzing input video, audio, and metadata to detect feature points, acquiring information indicating a position where a feature point is present as the information indicating a resume point, and storing it in the resume information recording means, together with the information related thereto, as feature point resume information, and a means for, when reproduction is restarted after being suspended, causing one of the resume points included in the plural resume information stored in the resume information recording means to be selected and causing reproduction to restart from the selected resume point.

Effect of the Invention

The effect of the invention is that when reproduction resumes, reproduction can restart from the reproduction stop operation position, or even when reproduction cannot restart from the reproduction stop operation position, reproduction can restart from a position based on stored resume information.

BRIEF DESCRIPTION OF THE DRAWINGS

FIGS. 3A and 3B show an example of the operation of the resume information automatic acquisition unit in the reproduction device according to the first embodiment.

FIG. 4 shows exemplary data stored in the storage unit in the reproduction device according to the first embodiment.

FIGS. 7A and 7B show exemplary data managed by the resume information management unit in the reproduction device according to the second embodiment.

FIGS. 18A to 18D show exemplary data managed by the resume information management unit in the fifth embodiment.

MODE FOR CARRYING OUT THE INVENTION

First Embodiment

Figure 1:
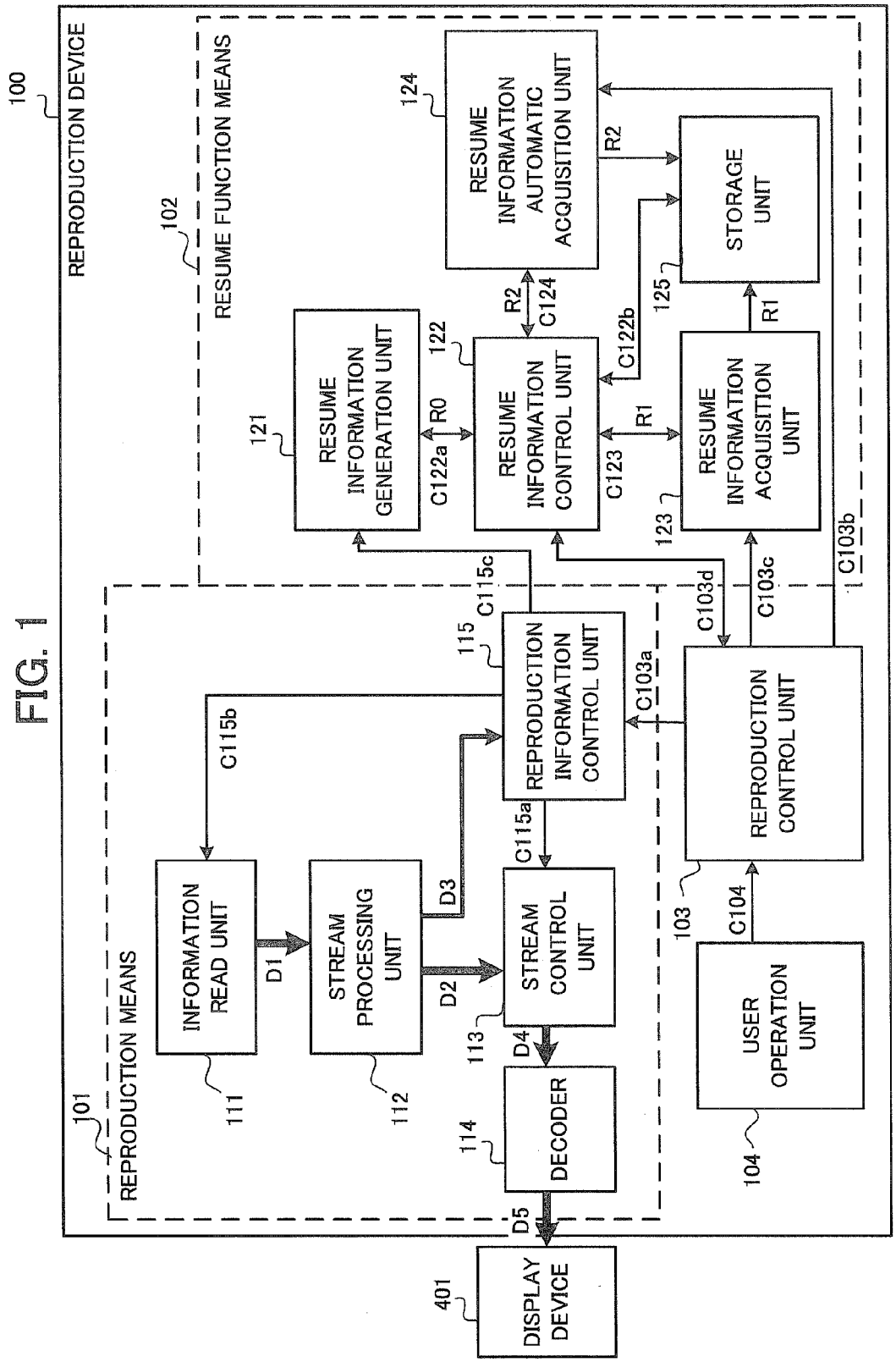
FIG. 1 is a block diagram schematically showing the structure of a reproduction device according to a first embodiment of the invention.

FIG. 1 is a block diagram schematically showing the structure of a reproduction device 100 according to a first embodiment of the invention. As shown in FIG. 1, the reproduction device 100 according to the first embodiment has a reproduction means 101 for reproducing a video and/or audio signal (referred to below as an audio-video signal), a resume function means 102 for managing the reproduction start position in resume reproduction, a reproduction control unit 103 that controls the reproduction means 101 and resume function means 102, and a user operation unit 104 on which user commands are entered. A display device 401 is connected to the reproduction device 100. The reproduction device 100 may be, for example, an optical disc reproduction device, a hard disk reproduction device, or a personal computer. The display device 401 may be built into the reproduction device 100.

As shown in FIG. 1, the reproduction means 101 includes an information read unit 111, a stream processing unit 112, a stream control unit 113, a decoder 114, and a reproduction information control unit 115. As also shown in FIG. 1, the resume function means 102 includes a resume information generation unit 121, a resume information control unit 122, a resume information acquisition unit 123 that functions as the first resume information acquisition means, a resume information automatic acquisition unit 124 that functions as the second resume information acquisition means, and a storage unit 125. The reproduction information control unit 115, resume information control unit 122, and reproduction control unit 103 function as a control means for controlling the whole device.

The information read unit 111 reads a stream (including an audio-video signal and reproduction control information) D1 from an information recording medium (not shown) and outputs it to the stream processing unit 112. The information recording medium is, for example, an optical disc or a hard disk. The information read unit 111 is, for example, an optical disc reproduction unit or a hard disk drive (HDD). Alternatively, the information read unit 111 may be a means for outputting a stream input from an external source.

The stream processing unit 112 outputs the audio-video signal D2 included in the stream D1 received from the information read unit 111 to the stream control unit 113 and outputs the reproduction control information D3 to the reproduction information control unit 115.

The reproduction information control unit 115 analyzes the reproduction control information D3 received from the information read unit 111 and outputs control commands C115a, C115b. When it receives from the reproduction control unit 103 a control command C103a that requests an action (event) such as play, stop, fast motion, reverse motion, slow motion, pause, fast forward, or rewind, for example, the reproduction information control unit 115 outputs a control command C115a to the stream control unit 113 on the basis of the reproduction control information D3.

The stream control unit 113 controls operations to transfer a stream D4 to the decoder 114 in accordance with the control commands C115a from the reproduction information control unit 115.

The decoder 114 decodes the stream D4 from the stream control unit 113 and supplies the display device 401 with a decoded audio-video signal D5.

The resume information generation unit 121 generates resume information R0 on the basis of control commands C115c from the reproduction information control unit 115. The resume information generation unit 121 generates resume information that is needed to resume reproduction. The resume information includes, for example, time information, title information, chapter information, player setting information, and disk setting information. Resume information R0 includes first resume information R1 indicating the reproduction stop operation position at a moment when the user operation unit 104 gives a command that stops reproduction and one or more items of second resume information R2 indicating a reproduction position at one or more moments of switching of reproduction operation type, moments of switching of reproduced information, or moments spaced at regular reproduction time intervals. The switching of reproduction operation type includes the switching among a plurality of actions, which include play, stop, fast motion, reverse motion, slow motion, and pause. The switching of reproduced information includes, for example, a change of title, a change of chapter, a change of GOP information, a change of angle (the angle in multi-angle content which allows a user operation to be made to view a video image captured from a desired angle), and a change between the showing and hiding of a picture-in-picture (PIP).

The reproduction control unit 103 outputs control commands C103a, C103b, C103c, C103d to corresponding modules. When the reproduction control unit 103 receives a control command C104 that stops reproduction from the user operation unit 104, it outputs control commands to stop reproduction. When the reproduction control unit 103 receives a control command C104 to resume reproduction from the user operation unit 104, it has the reproduction means 101 restart reproduction from either the reproduction stop operation position indicated by the first resume information R1 or one of the reproduction positions indicated by the one or more items of second resume information R2. The selection of the position from which to restart reproduction will be described later, but from among the reproduction stop operation positions indicated by the first resume information and second resume information, the reproduction control unit may be configured to restart reproduction from, for example, the position based on the resume information generated last.

The user operation unit 104 includes a remote control (not shown) for sending infrared signals, radio signals, or other types of command signals, and a user operation control unit (not shown) for receiving the command signals from the remote control and sending control commands corresponding to the received control signals to the reproduction control unit 103. Alternatively, the user operation unit 104 may be an operation unit built into the main body of the reproduction device 100.

The resume information acquisition unit 123 acquires the first resume information R1, indicating reproduction stop operation positions, from the resume information generation unit 121 and stores it in the storage unit 125. These reproduction stop operation positions may be set to include both the reproduction stop operation position when the user operation unit 104 issues a reproduction stop command and the reproduction stop position when reproduction is stopped by the turning off of system power.

When it receives from the reproduction control unit 103 a control command C103c requiring the acquisition of resume information, the resume information acquisition unit 123 outputs a control command C123 to the resume information control unit 122, requesting resume information acquisition. In the first embodiment, the resume information acquisition unit 123 acquires first resume information indicating the reproduction stop operation position when a given operation such as a user operation that stops reproduction (including an operation that stops reproduction by turning off system power) is made and stores the information in the storage unit 125.

When it receives from the reproduction control unit 103 a control command 103b requiring the acquisition of resume information, the resume information automatic acquisition unit 124 outputs a control command C124 to the resume information control unit 122, requesting resume information acquisition. In the first embodiment, the resume information automatic acquisition unit 124 acquires one or more items of second resume information R2 indicating a reproduction position at one or more moments of switching of reproduction operation type, moments of switching of reproduced information (such as the title or chapter), or moments spaced at regular reproduction time intervals, and stores the information in the storage unit 125. For example, the resume information automatic acquisition unit 124 monitors reproduction control information sent from the reproduction control unit 103, and when there is a change between different reproduction operations such as play, stop, fast motion, reverse motion, slow motion, and pause, when the reproduced information such as the chapter or title changes, or when the elapse of time changes from one state to another (at regular intervals of time, for example), second resume information R2 is automatically acquired from the resume information generation unit 121 and stored in the storage unit 125. The second resume information R2 acquired by the resume information automatic acquisition unit 124 is stored in the storage unit 125 with an assigned resume information number.

When the resume information acquisition unit 123 issues a control command C123 requesting resume information acquisition or when the resume information automatic acquisition unit 124 issues a control command C124 requesting resume information acquisition, the resume information control unit 122 sends a control command C122a requesting resume information acquisition to the resume information generation unit 121, acquires the requested resume information (first resume information R1 or second resume information R2), and supplies the information to the resume information acquisition unit 123 or resume information automatic acquisition unit 124. When it receives from the reproduction control unit 103 a control command C103d requesting the acquisition of resume reproduction information, the resume information control unit 122 gets the resume information (first resume information R1 or second resume information R2) from the storage unit 125 and sends the information to the reproduction control unit 103.

The operation of the reproduction device 100 according to the first embodiment will now be described. First, the user inputs a reproduction start command by operating a play button (not shown) on the user operation unit 104. In response to the input reproduction start command, the user operation unit 104 outputs a control command C104 to start reproduction to the reproduction control unit 103, and the reproduction control unit 103 sends control commands to the reproduction means 101 and the resume function means 102 in order to control their operation.

First, operation in normal reproduction will be described. In normal reproduction, the reproduction information control unit 115 sends the information read unit 111 a control command C115b to read data, and the information read unit 111 sends a stream D1 to the stream processing unit 112. The stream processing unit 112 receives the stream D1, sends an audio-video signal D2 to the stream control unit 113, and sends reproduction control information D3 to the reproduction information control unit 115. On the basis of the reproduction control information D3, the reproduction information control unit 115 sends control commands C115a needed for reproduction to the stream control unit 113. The stream control unit 113 controls operations that transfer the stream to the decoder 114. The decoder 114 decodes the input stream D4 and sends an audio-video signal D5 to the display device 401; the display device 401 displays video, and a speaker (not shown) outputs sound.

Operation in resumed reproduction will now be described. When an operation to start reproduction is made from the user operation unit 104 while reproduction is suspended, the user operation unit 104 sends a reproduction control command C104 to the reproduction control unit 103. The reproduction control unit 103 sends the resume information control unit 122 a control command C103d to acquire resume information. The resume information control unit 122 sends the storage unit 125 a control command C122b in accordance with the received control command C103d to acquire resume information, and gets resume information (first resume information R1 or second resume information R2) from the storage unit 125.

The reproduction control unit 103 sends the reproduction information control unit 115 a control command C103a to resume reproduction in accordance with the resume information read from the storage unit 125. The reproduction information control unit 115 sends the information read unit 111 a control command C115b to output the stream from a reproduction start position based on the resume information. The information read unit 111 sends the stream processing unit 112 a stream D1 starting from the reproduction start position based on the resume information.

The stream processing unit 112 sends the audio-video signal D2 to the stream control unit 113 and reproduction control information D3 to the reproduction information control unit 115. On the basis of the reproduction control information D3, the reproduction information control unit 115 sends the stream control unit 113 a control command C115a including data needed to resume reproduction. The stream control unit 113 controls transfer of the stream D4 to the decoder 114. The decoder 114 sends a decoded audio-video signal D5 to the display device 401. The display device 401 displays video based on the decoded video signal.

Figure 2:
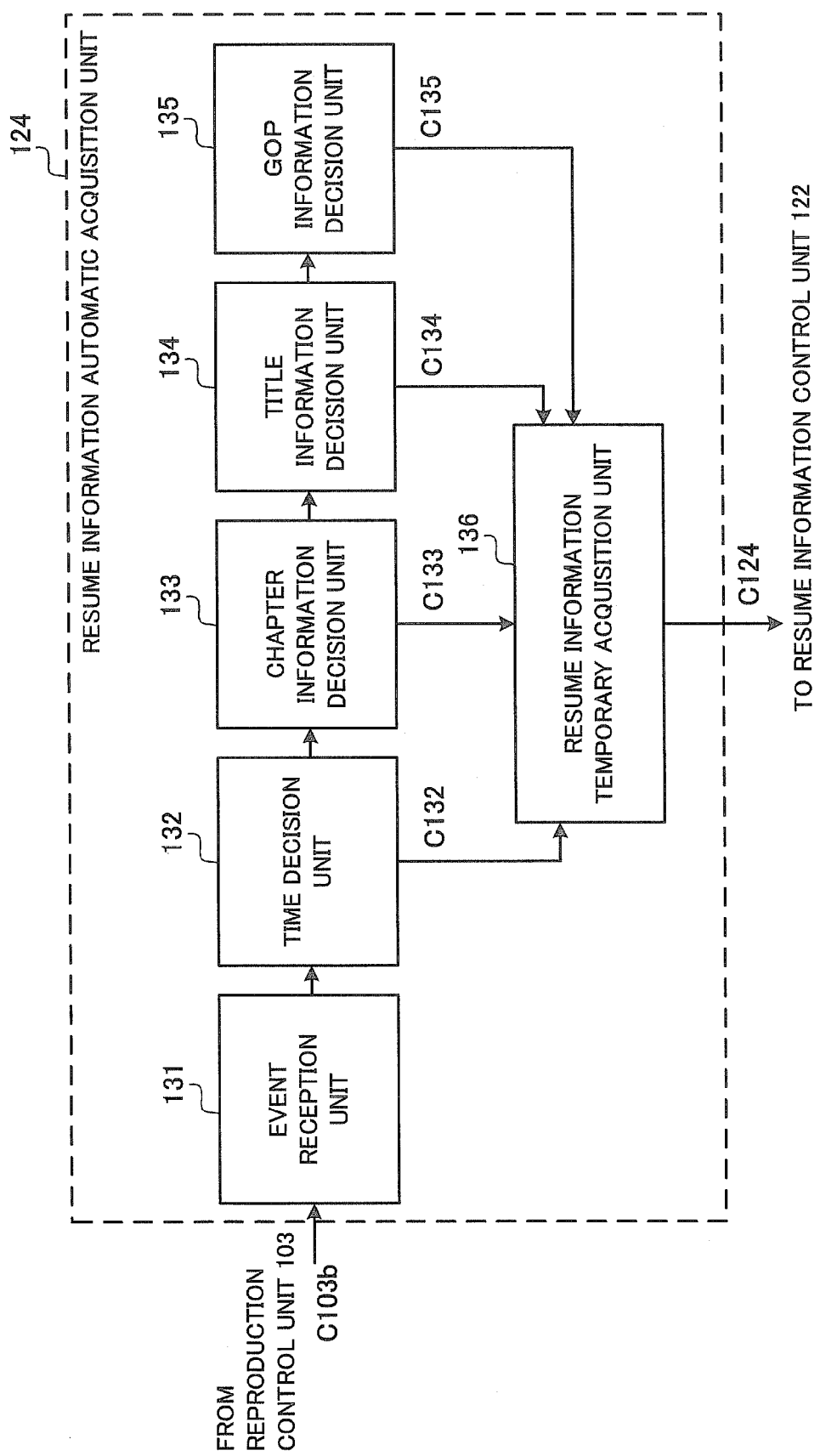
FIG. 2 is a block diagram schematically showing the structure of the resume information automatic acquisition unit in the reproduction device according to the first embodiment.

FIG. 2 is a block diagram schematically showing an example of the structure of the resume information automatic acquisition unit 124. As shown in FIG. 2, the resume information automatic acquisition unit 124 includes an event reception unit 131, a time decision unit 132, a chapter information decision unit 133, a title information decision unit 134, a GOP information decision unit 135, and a resume information temporary acquisition unit 136.

The event reception unit 131 receives reproduction control information C103b sent from the reproduction control unit 103 and sends the received reproduction control information C103b to the time decision unit 132, chapter information decision unit 133, title information decision unit 134, and GOP information decision unit 135.

The time decision unit 132 decides whether or not to acquire resume information on the basis of the elapsed reproduction time, which is the period of time that has elapsed from the start of reproduction. The time decision unit 132 has, for example, a function that acquires resume information automatically at regular predetermined intervals. To carry out this function of acquiring resume information automatically at regular intervals, the time decision unit 132 sends a control command C132 requesting resume information acquisition to the resume information temporary acquisition unit 136 each time the notified elapsed reproduction time reaches an integral multiple of a predetermined fixed time interval.

The chapter information decision unit 133 decides whether or not to acquire resume information on the basis of the chapter information of the video that is currently being reproduced. The chapter information decision unit 133 has the function of acquiring resume information automatically when the video chapter currently being reproduced changes. To carry out the function of acquiring resume information automatically when the video chapter currently being reproduced changes, when the chapter in the current reproduction position differs from the chapter given the next time reproduction control information is received, the chapter information decision unit 133 sends the resume information temporary acquisition unit 136 a control command C133 requesting resume information acquisition.

The title information decision unit 134 decides whether or not to acquire resume information on the basis of the title information of the video that is currently being reproduced. The title information decision unit 134 has, for example, the function of acquiring resume information automatically when the title of the video that is currently being reproduced changes. To carry out the function of acquiring resume information automatically when the title of the video that is currently being reproduced changes, when the title in the current reproduction position differs from the title given the next time reproduction control information is received, the title information decision unit 134 sends the resume information temporary acquisition unit 136 a control command C134 requesting resume information acquisition.

The GOP information decision unit 135 decides whether or not to acquire resume information on the basis of the GOP information of the video that is currently being reproduced. The GOP information decision unit 135 has, for example, the function of acquiring resume information automatically when the GOP of the video that is currently being reproduced changes. To carry out the function of acquiring resume information automatically when the GOP of the video that is currently being reproduced changes, when the GOP information in the current reproduction position differs from the GOP information given the next time reproduction control information is received, the GOP information decision unit 135 sends the resume information temporary acquisition unit 136 a control command C135 requesting resume information acquisition.

The resume information temporary acquisition unit 136 sends the resume information control unit 122 a control command C124 to acquire second resume information R2 in accordance with the received control command C132, C133, C134, or C135.

In the description of FIG. 2, the second resume information R2 is acquired automatically when reproduction information changes (when the stream state changes), and the changes in the stream state include, for example, changes in time information, chapter changes, and title, changes. The changes in the stream state may also include changes caused by user operations such as switching among play, stop, fast motion, reverse motion, slow motion, pause, fast forward, and rewind, for example. Other possible changes in the stream state include changes of video capture angle, a change between showing and hiding a picture-in-picture (PIP), and so on. The resume information automatic acquisition unit 124 may include a selected subset of the time decision unit 132, chapter information decision unit 133, title information decision unit 134, and GOP information decision unit 135 instead of including all of them.

FIGS. 3A and 3B show an example of the operation of the resume information automatic acquisition unit 124 in the reproduction device 100 according to the first embodiment. FIGS. 3A and 3B show the operation that acquires second resume information R2 automatically at regular intervals in the stream read by the information read unit 111. In FIGS. 3A and 3B, the horizontal axis represents time, intervals $P_A$ and $P_C$ are acquirable intervals (resumable intervals) in which resume information acquisition is permitted, and interval $P_B$ is a non-acquirable interval (non-resumable interval) in which resume information acquisition is not permitted. Resume information acquisition may not be permitted in interval $P_B$ for any of several reasons; on a DVD video disc, it may be an interval in which the restarting of reproduction by a resume operation carried out by the user is inhibited. The circles in FIGS. 3A and 3B indicate moments when the second resume information 32 can be acquired automatically at regular intervals, and the crosses indicate moments when the second resume information R2 cannot be acquired automatically.

While the stream in the example shown in FIG. 3A is being reproduced, the resume information automatic acquisition unit 124 can acquire second resume information R2 automatically at regular intervals in intervals $P_A$ and $P_C$ and cannot acquire second resume information R2 automatically in interval $P_B$. If processing to stop reproduction occurs in the resumable intervals $P_A$ and $P_C$, the first resume information R1 can be acquired, and if processing to stop reproduction occurs in the non-resumable interval $P_B$, the first resume information R1 cannot be acquired. Since no resume information can be acquired in interval $P_B$, it is not possible to restart reproduction from a reproduction stop operation position indicated by the resume information acquired by the resume information acquisition unit 123, even if a request to resume reproduction is made later by a user operation. If the second resume information R2 is acquired automatically at regular intervals, as shown in FIG. 3B, the second resume information R2 at the moment $t_A$ at the end of the interval $P_A$ immediately preceding the non-resumable interval $P_B$ is stored. Accordingly, when a user operation issues a command to resume reproduction, reproduction can restart from the final moment $t_A$ of the resumable interval $P_A$, which becomes the resume point. Accordingly, even if an operation that stops reproduction is made in an interval in which resume information acquisition is not permitted, reproduction can be restarted from a position close to the reproduction stop operation position, immediately preceding the non-acquirable interval.

FIG. 4 shows an example of the second resume information R2 stored by the resume information automatic acquisition unit 124 in the storage unit 125 in the reproduction device 100 according to the first embodiment. In the example shown in FIG. 4, each item of second resume information R2 stored in the storage unit 125 includes a title number, a chapter number, reproduction time information, and a resume number. In the example shown in FIG. 4, the items of the resume information are given resume numbers 1, 2, 3, 4 in reverse chronological order. If information (not shown in FIG. 4) giving the current settings of the reproduction apparatus, the settings of the optical disc used as an information recording medium, and so on is recorded in the resume information stored in the storage unit 125, when reproduction is restarted by the resume function, reproduction can restart with the same settings.

Figure 5:
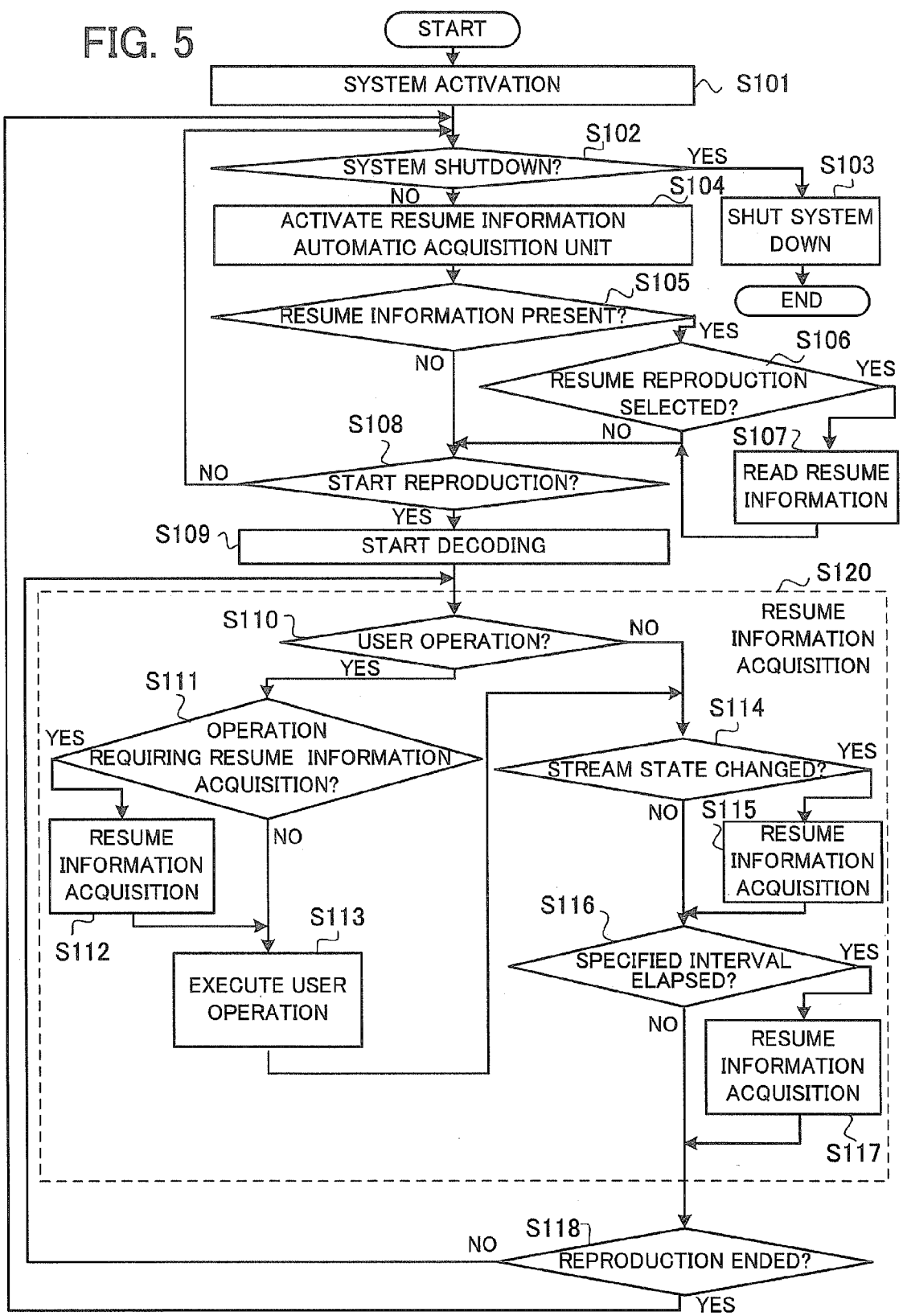
FIG. 5 is a flowchart schematically illustrating the operation of the reproduction device according to the first embodiment (the reproduction method according to the first embodiment).

FIG. 5 is a flowchart schematically illustrating the operation of the reproduction device 100 according to the first embodiment (the reproduction method according to the first embodiment). When the reproduction device 100 (also referred to as 'the system') is powered on, the system is activated (step S101). After the system is activated, the reproduction control unit 103 checks whether system power has been turned off (also referred to as 'system shutdown') (step S102), and if there is a system shutdown request (power off operation), processing to shut the system down is performed (step S103). If there is no request to shut the system down when system shutdown is checked (step S102), the reproduction control unit 103 activates the resume information automatic acquisition function carried out by the resume information automatic acquisition unit 124 (step S104). Alternatively, the resume information automatic acquisition function may be activated when reproduction starts.

Operating through the resume information control unit 122, the reproduction control unit 103 checks to determine whether there is resume information in the storage unit 125 (step S105). If there is resume information, the reproduction control unit 103 checks whether or not to resume reproduction (step S106), and if resume reproduction is selected, reads the resume information from the storage unit 125 through the resume information control unit 122 (step S107). If there is resume information in the storage unit 125, the reproduction control unit 103 starts reproduction by the resume function; if there is no resume information, normal reproduction starts (step S108). Next the reproduction control unit 103 has the reproduction means 101 start decoding processing and output an audio-video signal D5 (step S109).

The resume function means 102 executes processing to acquire resume information until reproduction ends (step S120). When reproduction ends, the reproduction control unit 103 returns the process to step S102 (step S118).

In the processing to acquire resume information (step S120), the resume function means 102 advances the process to step S111 if a user operation has been made (step S110), and to step S114 if no such user operation has been made (step S110). In step S111, the resume information control unit 122 decides whether the user operation is an operation for which resume information must be acquired. An operation for which resume information must be acquired is an operation that stops reproduction (including processing to stop reproduction by turning off system power) or the like. If it is decided in step S111 that the user operation is an operation for which resume information must be acquired, the reproduction control unit 103 has the resume information control unit 122 in the resume function means 102 acquire first resume information R1 (step S112). If the system is set so that resume information is acquired at every user operation, the resume information control unit 122 has the resume information control unit 122 acquire resume information each time a user operation is made. After the resume information is acquired (step S112) or if the operation is not an operation for which resume information must be acquired (step S111), then after the user operation is executed (step S113), the resume information control unit 122 advances the process to step S114.

In step S114, the resume information control unit 122 checks whether the stream state has changed. If a stream state change has occurred, the process returns to step S115. If a setting has been made not to acquire a resume information when the stream state changes, the resume information control unit 122 advances the process to step S116. These stream state changes refer to a change of GOP, a change of chapter, a change of title, and so on. The stream state changes may also include the addition of an angle, a change between the showing and hiding of a PIP, and other such changes.

In step S116, when a specified period of time has elapsed, the resume information control unit 122 has the resume information automatic acquisition unit 124 execute processing to acquire resume information automatically (steps S116, S117). After resume information is acquired (step S117) or if the specified period of time has not elapsed (step S116), the resume information control unit 122 decides whether reproduction has ended (step S118) and continues the resume information acquisition process (step S120) until reproduction ends. If it is decided in step S118 that reproduction has ended, the reproduction control unit 103 returns the process to step S102.

As described above, when reproduction resumes, the reproduction device 100 and reproduction method according to the first embodiment allow reproduction to restart from the reproduction stop operation position or, even if reproduction cannot be restarted from the reproduction stop operation position, allow reproduction to restart from a position based on the second resume information R2 stored in the storage unit 125. Accordingly, even when reproduction cannot be restarted from the reproduction stop operation position, there is a pseudo-resume function that can restart reproduction in a way that provides the user with the same level of convenience as the resume function that restarts reproduction from the reproduction stop operation position.

In the reproduction device 100 or reproduction method, parameters such as the intervals of time at which resume information is automatically acquired may be selectable (settable) by a user operation.

Since multiple items of resume information are stored in the storage unit 125, the acquired items of resume information may be displayed on the display device 401, and the user operation unit 104 may be used to select a desired item of resume information as the start position of resumed reproduction. In that case, even when there is first resume information R1 concerning a position where reproduction was stopped by a user operation, reproduction can be resumed from a position other than the position indicated by the first resume information R1.

Second Embodiment

Figure 6:
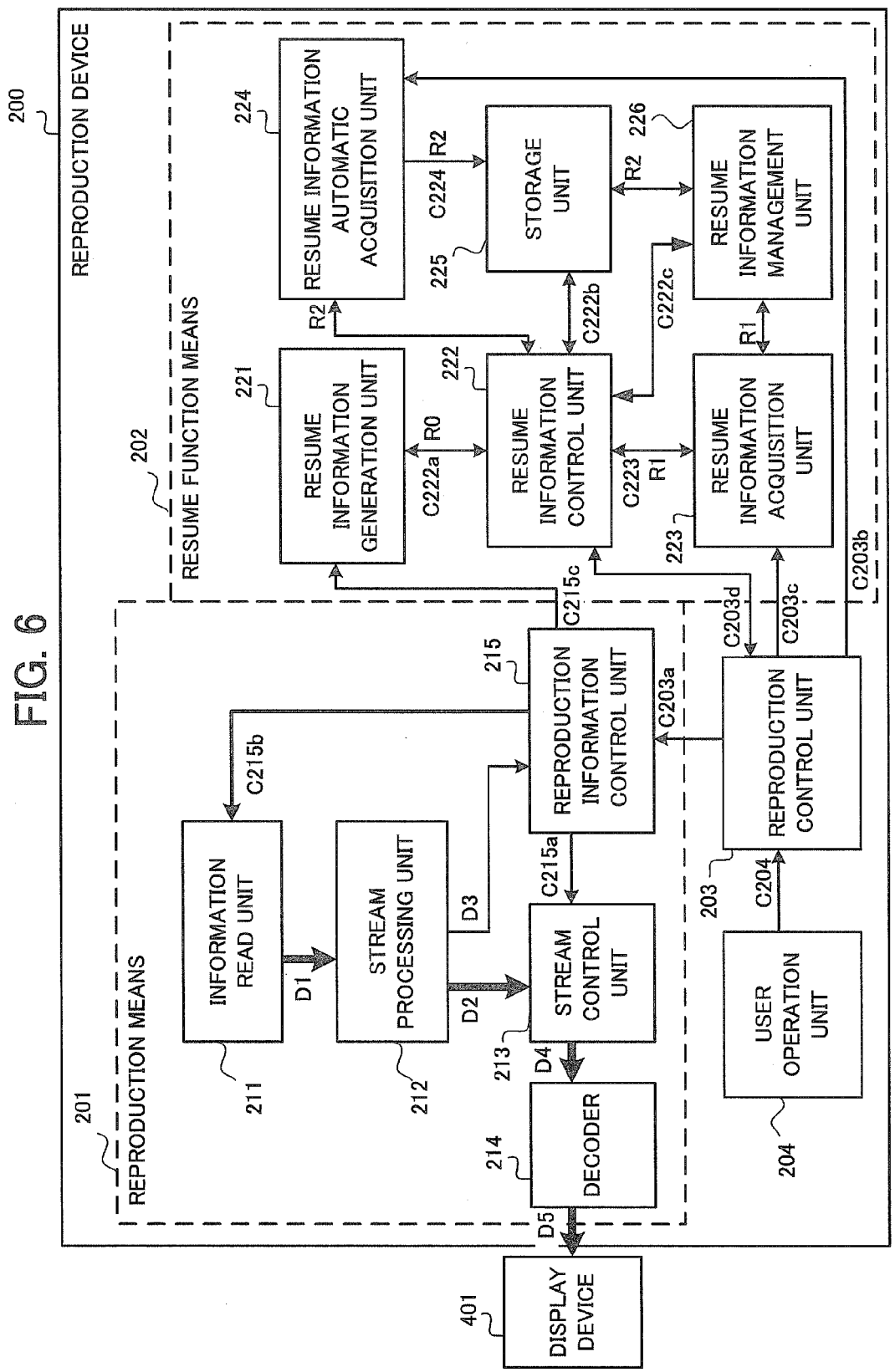
FIG. 6 is a block diagram schematically showing the structure of a reproduction device according to a second embodiment of the invention.

FIG. 6 is a block diagram schematically showing the structure of a reproduction device 200 according to a second embodiment of the invention. As shown in FIG. 6, the reproduction device 200 according to the second embodiment includes a reproduction means 201 for reproducing an audio-video signal, a resume function means 202 for managing the reproduction start position in resume reproduction, a reproduction control unit 203 that controls the reproduction means 201 and resume function means 202, and a user operation unit 204 on which user commands are entered. A display device 401 is connected to the reproduction device 200.

As shown in FIG. 6, the reproduction means 201 includes an information read unit 211, a stream processing unit 212, a stream control unit 213, a decoder 214, and a reproduction information control unit 215. The resume function means 202 includes a resume information generation unit 221, a resume information control unit 222, a resume information acquisition unit 223 that functions as the first resume information acquisition means, a resume information automatic acquisition unit 224 that functions as the second resume information acquisition means, a storage unit 225, and a resume information management unit 226.

The reproduction device 200 according to the second embodiment differs from the reproduction device 100 according to the first embodiment in that the resume function means 202 includes the resume information management unit 226. The reproduction means 201, reproduction control unit 203, and user operation unit 204 in the second embodiment have the same functions as the reproduction means 101, reproduction control unit 103, and user operation unit 104 in the first embodiment. Control commands C203a to C203d, C204, and C215a to C215c in FIG. 6 are equivalent to control commands C103a to C103d, C104, and C115a to C115c described earlier with reference to FIG. 1.

The resume information generation unit 221, resume information control unit 222, resume information acquisition unit 223, resume information automatic acquisition unit 224, and storage unit 225 in the second embodiment have the same functions as the resume information generation unit 121, resume information control unit 122, resume information acquisition unit 123, resume information automatic acquisition unit 124, and storage unit 125 in the first embodiment. Control commands C222a, C222b, C223, and C224 in FIG. 6 are equivalent to control commands C122a, C122b, C123, and C124 described earlier with reference to FIG. 1.

The resume information management unit 226 manages the first resume information R1 acquired by the resume information acquisition unit 223 and second resume information R2 acquired by the resume information automatic acquisition unit 224. The resume information management unit 226 arranges the resume information so that the user can select a desired item easily when reproduction resumes. The resume information management unit 226 adds information such as type information indicating whether the resume information has been acquired automatically or by a user operation and information indicating positions where resume information could not be acquired (for example, a reproduction stop operation position when an operation that stopped reproduction was made in a non-resumable interval), to the resume information (first resume information R1 or second resume information R2). The resume information management unit 226 may compare the first resume information R1 acquired by the resume information acquisition unit 223 with the second resume information R2 stored in the storage unit 225, and if there is a discrepancy, may perform a process that selectively combines the two types of resume information or selectively adds one to the other.

FIGS. 7A and 7B show exemplary data managed by the resume information management unit 226 in the reproduction device 200 according to the second embodiment. As shown in the upper part of FIG. 7A, the first resume information R1 acquired by the resume information acquisition unit 223, (or stored in the storage unit 225) usually includes just a single item of information. As shown in the lower part of FIG. 7B, however, the second resume information R2 acquired by the resume information automatic acquisition unit 224 and stored in the storage unit 225 usually includes two or more items. The resume information management unit 226 compares the first resume information R1 with the second resume information R2 and uses the result of the comparison to determine an optimal position from which to start resume reproduction. In the example shown in FIG. 7A, there is a discrepancy between the first resume information R1 acquired by the resume information acquisition unit 223 (resume information acquired by the resume information acquisition unit 223 when an operation that stops reproduction was made) and the second resume information R2 stored in the storage unit 225 (the latest resume information acquired by the resume information automatic acquisition unit 224 during the reproduction period (such as the resume information acquired at regular intervals), for example). One possible cause is that for some reason the resume information acquisition unit 223 could not acquire first resume information after the reproduction time of 10:00, or circumstances did not permit the resume information to be acquired. Whether the first resume information R1 acquired by the resume information acquisition unit 223 agrees with the second resume information R2 stored in the storage unit 225 is determined by comparing the time (reproduction stop time) indicated by the first resume information R1 acquired by the resume information acquisition unit 223 with the time (reproduction stop time) indicated by the second resume information R2 stored in the storage unit 225 and checking whether the difference exceeds a given value. Since an interval during which second resume information R2 was automatically acquired can be presumed to be an interval that has already been reproduced, if the first resume information R1 acquired by the resume information acquisition unit 223 disagrees with the second resume information stored in the storage unit 225, reproduction is preferably resumed from a position based on the second resume information R2 stored in the storage unit 225.

If an operation that stops reproduction is made in a non-resumable interval (such as a title or chapter) in which the information recording medium does not permit the resumption of reproduction, the resume information acquisition unit 223 cannot acquire the first resume information R1. Accordingly, if the user later issues a command to resume reproduction from the user operation unit 204, reproduction may start from the first play position, which is a reproduction start position preset on the information recording medium. With the reproduction device 200 according to the second embodiment, however, even if the operation that stops reproduction is made in a non-resumable interval in which the information recording medium does not permit the resumption of reproduction, when reproduction resumes, the resume information management unit 226 allows the reproduction start position to be selected from the resume points indicated by the second resume information R2.

Figure 8:
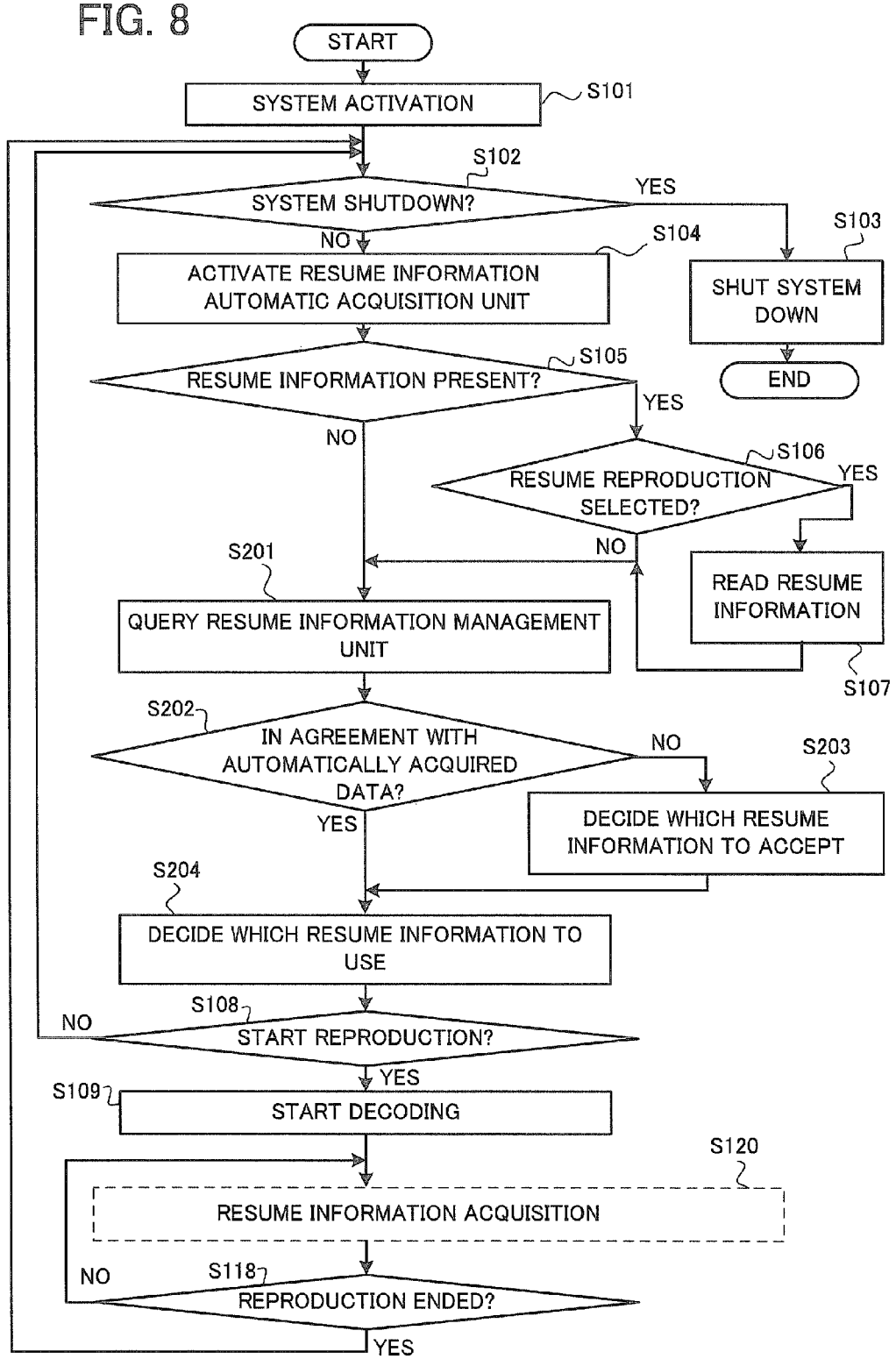
FIG. 8 is a flowchart schematically illustrating the operation of the reproduction device according to the second embodiment (the reproduction method according to the second embodiment).

FIG. 8 is a flowchart schematically illustrating the operation of the reproduction device 200 according to the second embodiment (the reproduction method according to the second embodiment). Steps S101 to S107 and steps S108, S109, S118, and S120 in FIG. 8 are the same steps S101 to S107 and steps S108, S109, S118, and S120 that were described earlier with reference to FIG. 5. The operation of the reproduction device 200 according to the second embodiment differs from the operation of the reproduction device 100 according to the first embodiment in that steps S201 to S204 are added.

In the second embodiment, when it is decided in step S105 that there is no resume information, when resume reproduction is not selected in step S106, or when resume information has been read in step S107, the resume information control unit 222 queries the resume information management unit 226 (step S201). The resume information management unit 226 then checks whether the automatically acquired second resume information R2 is in agreement with the first resume information R1 read in step S107 (step S202) and advances the process to step S204 if the information is in agreement or to step S203 if the information is not in agreement. In step S203, the resume information management unit 226 compares the automatically acquired second resume information R2 with the first resume information R1 acquired by the resume information acquisition unit 223 and decides which resume information to accept. In step S204, the resume information management unit 226 decides on the resume information to be used and advances the process to step S108. Except for the above described points, the he operations in FIG. 8 are the same as the operations described earlier with reference to FIG. 5.

As described above, when reproduction resumes, the reproduction device 200 and reproduction method according to the second embodiment allow reproduction to restart from the reproduction stop operation position or, even if reproduction cannot be restarted from the reproduction stop operation position, allow reproduction to restart from a position based on the second resume information R2 stored in the storage unit 225. Accordingly, even when reproduction cannot be restarted from the reproduction stop operation position, there is a pseudo-resume function that can restart reproduction in a way that provides the user with the same level of convenience as the resume function that restarts reproduction from the reproduction stop operation position.

In the reproduction device 200 and reproduction method according to the second embodiment, in managing the resume information, the resume information management unit 226 can distinguish between the first resume information R1 indicating a reproduction operation stop position acquired by a user operation and the second resume information R2 acquired by the resume information automatic acquisition unit 224. The resume information can therefore be stored with a distinction between information indicating a resume reproduction position acquired by a user operation and information indicating an automatically acquired resume reproduction position. Accordingly, on the resume reproduction selection screen displayed on the display device 401, additional information distinguishing between resume information acquired by a user operation and resume information acquired by the resume information automatic acquisition unit 224 can be displayed. User operations can therefore be facilitated by displaying multiple items of acquired resume information on the display device 401 and enabling one item of resume information to be selected as the resume reproduction start position by an operation performed on the user operation unit 204.

For parts that have already been reproduced, the reproduction device 200 and reproduction method according to the second embodiment generate resume information automatically at regular intervals, so it is easy to tell what parts have not been reproduced (the unreproduced range) and what titles have not been watched.

When a reproduction stop operation position acquired by a user operation is in a non-resumable interval, reproduction would usually start from the first position of the content, but the reproduction device 200 according to the second embodiment acquires resume information automatically and can determine the reproduction start position on the basis of the automatically acquired resume information. If the entire main content constitutes a non-resumable interval, as in BD-J (Blue-ray Disc Java) content, for example, but reproduction is permitted to resume at positions where the title changes, in resume reproduction it becomes possible to start reproduction from a position where the title changes.

Regarding points other than the above, the second embodiment is the same as the first embodiment.

Third Embodiment

Figure 9:
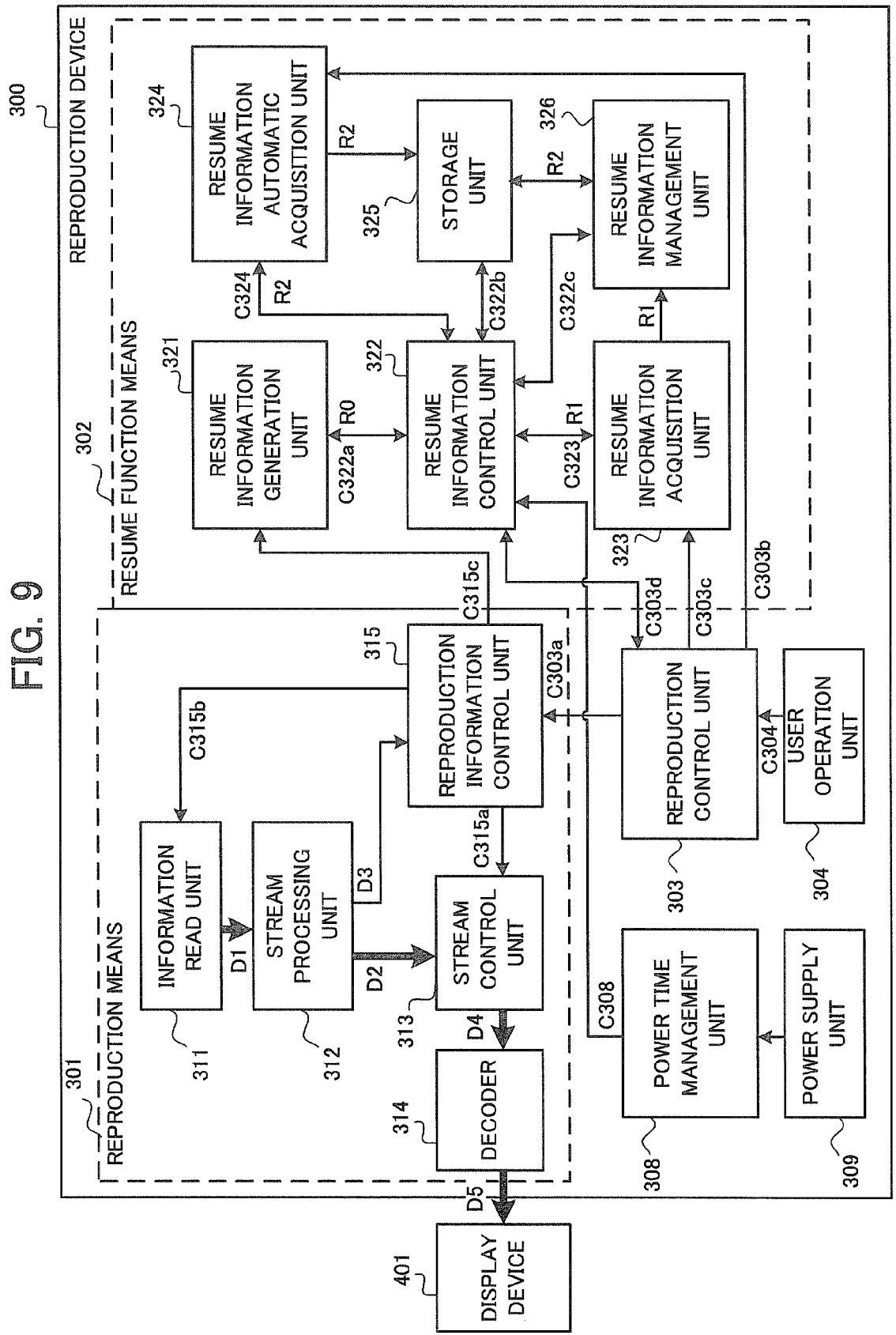
FIG. 9 is a block diagram schematically showing the structure of a reproduction device according to a third embodiment of the invention.

FIG. 9 is a block diagram schematically showing the structure of a reproduction device 300 according to a third embodiment of the invention. As shown in FIG. 9, the reproduction device 300 in the third embodiment includes a reproduction means 301 for reproducing an audio-video signal, a resume function means 302 for managing the reproduction start position in resume reproduction, a reproduction control unit 303 that controls the reproduction means 301 and resume function means 302, and a user operation unit 304 on which user commands are entered. The reproduction device 300 in the third embodiment also includes a power supply unit 309 and a power time management unit 308. The reproduction device 300 is connected to a display device 401.

As shown in FIG. 9, the reproduction means 301 includes an information read unit 311, a stream processing unit 312, a stream control unit 313, a decoder 314, and a reproduction information control unit 315. The resume function means 302 includes a resume information generation unit 321, a resume information control unit 322, a resume information acquisition unit 323 that functions as the first resume information acquisition means, a resume information automatic acquisition unit 324 that functions as the second resume information acquisition means, a storage unit 325, and a resume information management unit 326.

The reproduction device 300 in the third embodiment differs from the reproduction device 200 in the second embodiment by having the power time management unit 308 and the power supply unit 309. The power time management unit 308 manages and retains time information from the turning on to the turning off of system power. The power supply unit 309 manages the turning on and off of the entire reproduction device 300 (system). The reproduction means 301, resume function means 302, reproduction control unit 303, and user operation unit 304 have the same functions as the reproduction means 201, resume function means 202, reproduction control unit 203, and user operation unit 304 in the second embodiment. Control commands C303a to C303d, C304, and C315a to C315c in FIG. 9 are equivalent to control commands C203a to C203d, C204, and C215a to C215c described earlier with reference to FIG. 6.

The resume information generation unit 321, resume information control unit 322, resume information acquisition unit 323, resume information automatic acquisition unit 324, storage unit 325, and resume information management unit 326 in the third embodiment have the same functions as the resume information generation unit 221, resume information control unit 222, resume information acquisition unit 223, resume information automatic acquisition unit 224, storage unit 225, and resume information management unit 226 in the second embodiment. Control commands C322a to C322c, C323, and C324 in FIG. 9 are equivalent to control commands C222a to C222c, C223, and C224 described earlier with reference to FIG. 6.

Figure 10:
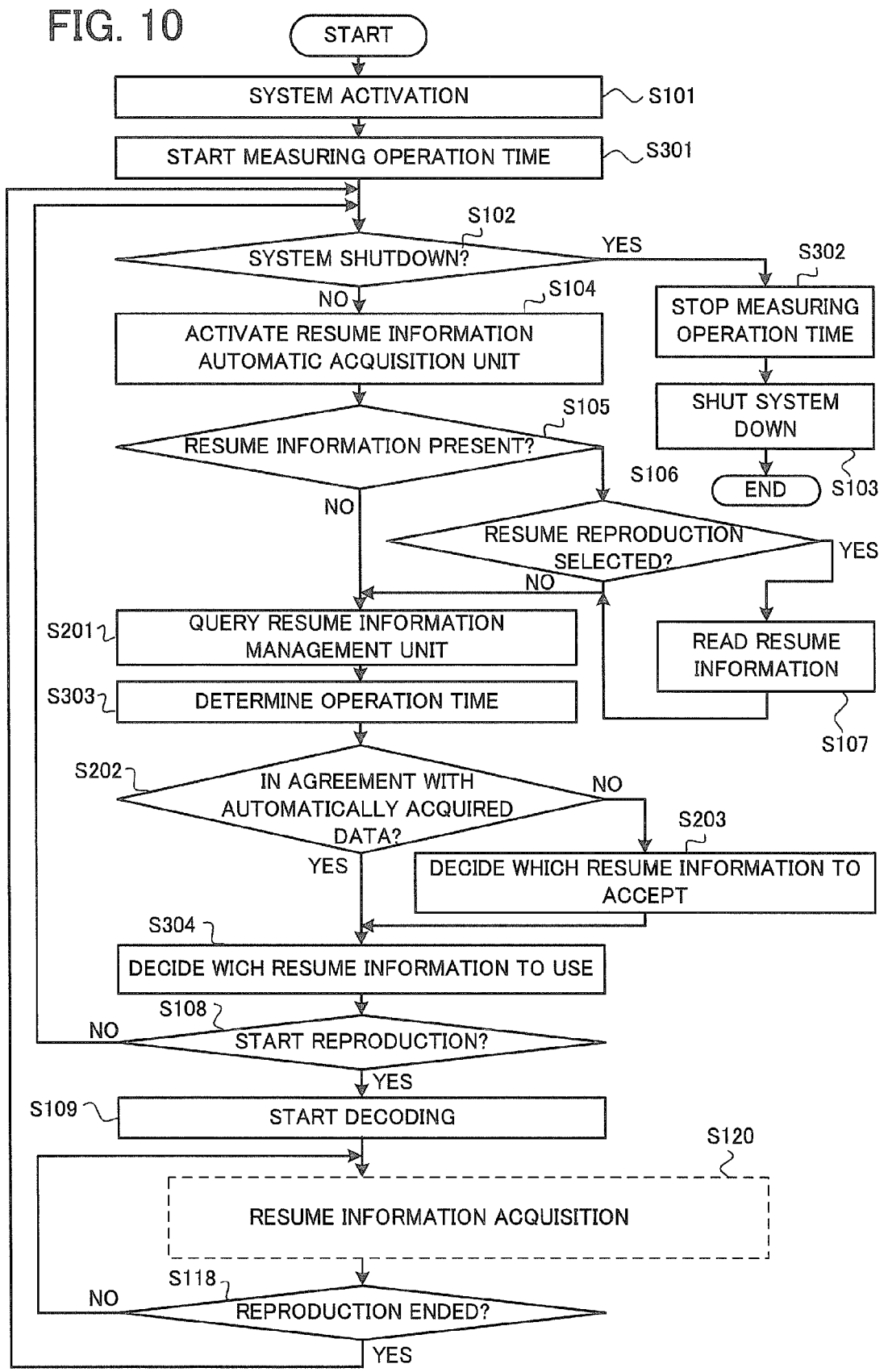
FIG. 10 is a flowchart schematically illustrating the operation of the reproduction device according to the third embodiment (the reproduction method according to the third embodiment).

FIG. 10 is a flowchart schematically illustrating the operation of the reproduction device 300 according to the third embodiment (the reproduction method according to the third embodiment). Steps S101 to S107, S108, S109, S118, S120, and S201 to 203 in FIG. 10 are the same as steps S101 to S107, S108, S109, S118, S120, and S201 to S203 that were described earlier with reference to FIG. 8. The operation of the reproduction device 300 according to the third embodiment differs from the operation of the reproduction device 200 according to the second embodiment in the addition of processing in steps S301, S302, and S303, and in the content of the processing in step S304.

In the reproduction device 300 in the third embodiment, the power time management unit 308 starts measuring the system operation time (step S301) when the system starts up (step S101) and stops measuring the system operation time (step S302) when the system is shut down (step S130).

In the reproduction device 300 according to the third embodiment, the resume information control unit 322 queries the resume information management unit 326 (step S201) when it is decided in step S105 that there is no resume information, when reproduction does not resume in step S106, or when resume information can be read in step S107. In the reproduction device 300 in the third embodiment, after the query to the resume information management unit 326 (step S201), the power time management unit 308 determines the system operation time (step S303) and sends operation time information C308 to the resume information control unit 322. The resume information management unit 326 compares the automatically acquired second resume information R2 with the first resume information R1 read in step S107 (step S202), and advances the process to step S204 if there is no discrepancy or to step S203 if there is a discrepancy. In step S203 the resume information management unit 326 compares the automatically acquired second resume information R2 with the first resume information R1 acquired by the resume information acquisition unit 223 and decides which resume information to accept. In step S304, the resume information management unit 326 decides on the resume information to be used in accordance with the system operation time and advances the process to step S108. The rest of the operation of the reproduction device 300 in the third embodiment is the same as the operation of the reproduction device 200 in the second embodiment.

Figure 11A:
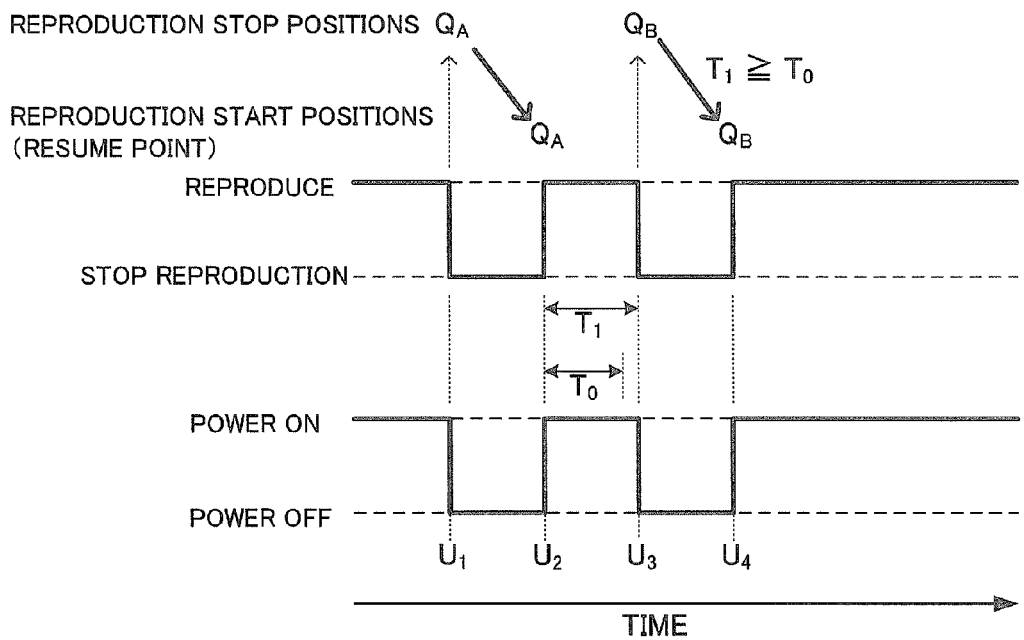
FIGS. 11A and 11B show examples of the resume information determination operation using the time managed by the power time management unit in the reproduction device according to the third embodiment.
Figure 11B:
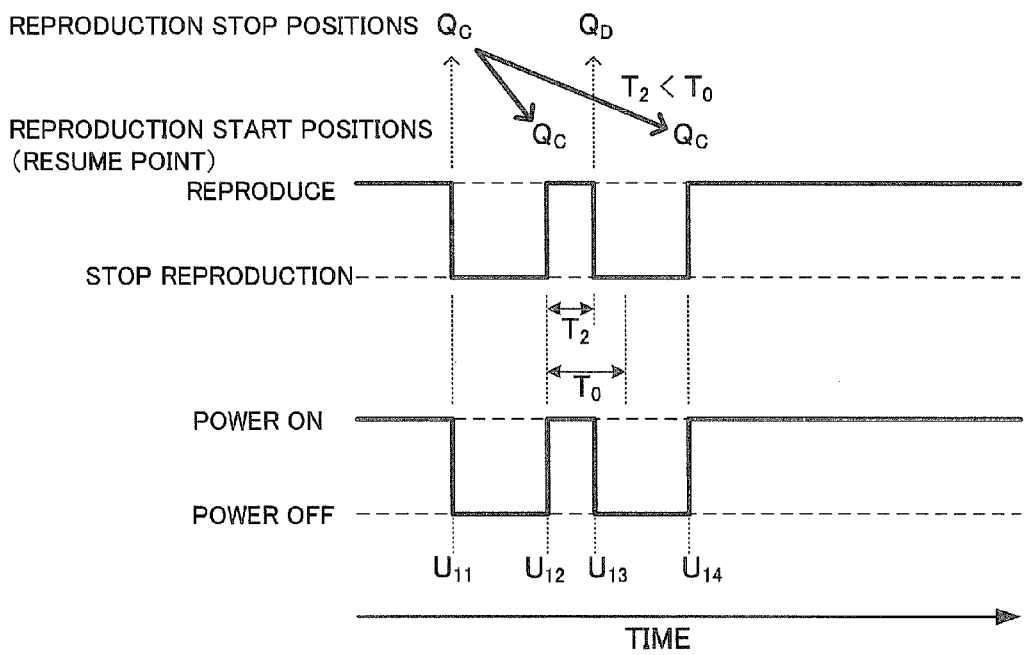

FIGS. 11A and 11B show examples of the operation of the power time management unit 308 in the reproduction device 300 according to the third embodiment. FIG. 11A shows the operation when a power-on period $T_1$ is as long as or longer than a given reference period $T_0$, and FIG. 11B shows the operation when a power-on period $T_2$ is shorter than the given reference period $T_0$.

In the reproduction device 300 according to the third embodiment, as shown in FIG. 11A, if reproduction stops (and power is turned off) at a reproduction stop position $Q_A$ at time $U_1$ and then resumes (and power is turned on) at time $U_2$, reproduction stop position $Q_A$ becomes the reproduction start position (resume point). Similarly, after the power-on period $T_1$ that is as long as or longer than the reference period $T_0$, if reproduction stops (and power is turned off) at a reproduction stop position $Q_B$ at time $U_3$ and then resumes (and power is turned on) at time $U_4$, reproduction stop position $Q_B$ becomes the reproduction start position (resume point).

In the reproduction device 300 according to the third embodiment, as shown in FIG. 11B, if reproduction stops (and power is turned off) at a reproduction stop position $Q_C$ at time $U_{11}$ and then resumes (and power is turned on) at time $U_{12}$, reproduction stop position $Q_C$ becomes the reproduction start position (resume point). After a power-on period $T_2$ that is shorter than the reference period $T_0$, however, if reproduction stops (and power is turned off) at a reproduction stop position $Q_D$ at time $U_{13}$ and then resumes (and power is turned on) at time $U_{14}$, position $Q_C$, instead of the reproduction stop position $Q_D$, becomes the reproduction start position (resume point).

In the reproduction device 300 according to the third embodiment, which uses the time data acquired by the power time management unit 308, a reproduction stop position ($Q_D$ in FIG. 11B) after a reproduction period or power-on period shorter than the reference period $T_0$ is not used as the reproduction start position (resume point) in resume reproduction. Instead, the resume information control unit 322 uses the resume stop position $Q_C$ indicated by the preceding resume information as the reproduction start position (resume point) in resume reproduction. This type of control operation is performed because there is a strong possibility that a reproduction period shorter than the reference period $T_0$ is not positioned where the user made a reproduction start operation for viewing purposes (and therefore has not been watched by the user), and even if the user made a reproduction start operation there, a very short reproduction period is likely to be forgotten and it might be preferable to watch that period again. Therefore, the reproduction device 300 according to the third embodiment can keep reproduction periods shorter than the reference period $T_0$ from being missed.

Since the reproduction device 300 according to the third embodiment holds multiple items of resume information at power-off (or reproduction stop time), even if the turning on and off of power is repeated several times, reproduction can resume from a reproduction stop position preceded by a reproduction period that lasted as long as or longer than the reference period $T_0$.

In the reproduction device 300 according to the third embodiment, since the power time management unit 308 measures the reproduction period, even if a reproduction stop operation is made in an non-resumable interval, reproduction can be started in a position close to the reproduction stop position by using a time search function (by starting reproduction from a reproduction position based on reproduction time) if time search is allowed in the non-resumable interval.

Regarding points other than the above, the third embodiment is the same as the first or second embodiment.

The control operations based on the power-on/off time managed by the power time management unit 308 in the third embodiment can also be applied to reproduction devices such as the reproduction device 100 in the first embodiment.

Fourth Embodiment

The resume function of the reproduction device for reproducing an audio-video signal input from an external or internal source described in the fourth embodiment has the function of acquiring resume information when the user makes a stop operation, a shutdown operation, or the like, and the function of analyzing the stream being reproduced and automatically acquiring scenes significant for the user as resume information.

Figure 12:
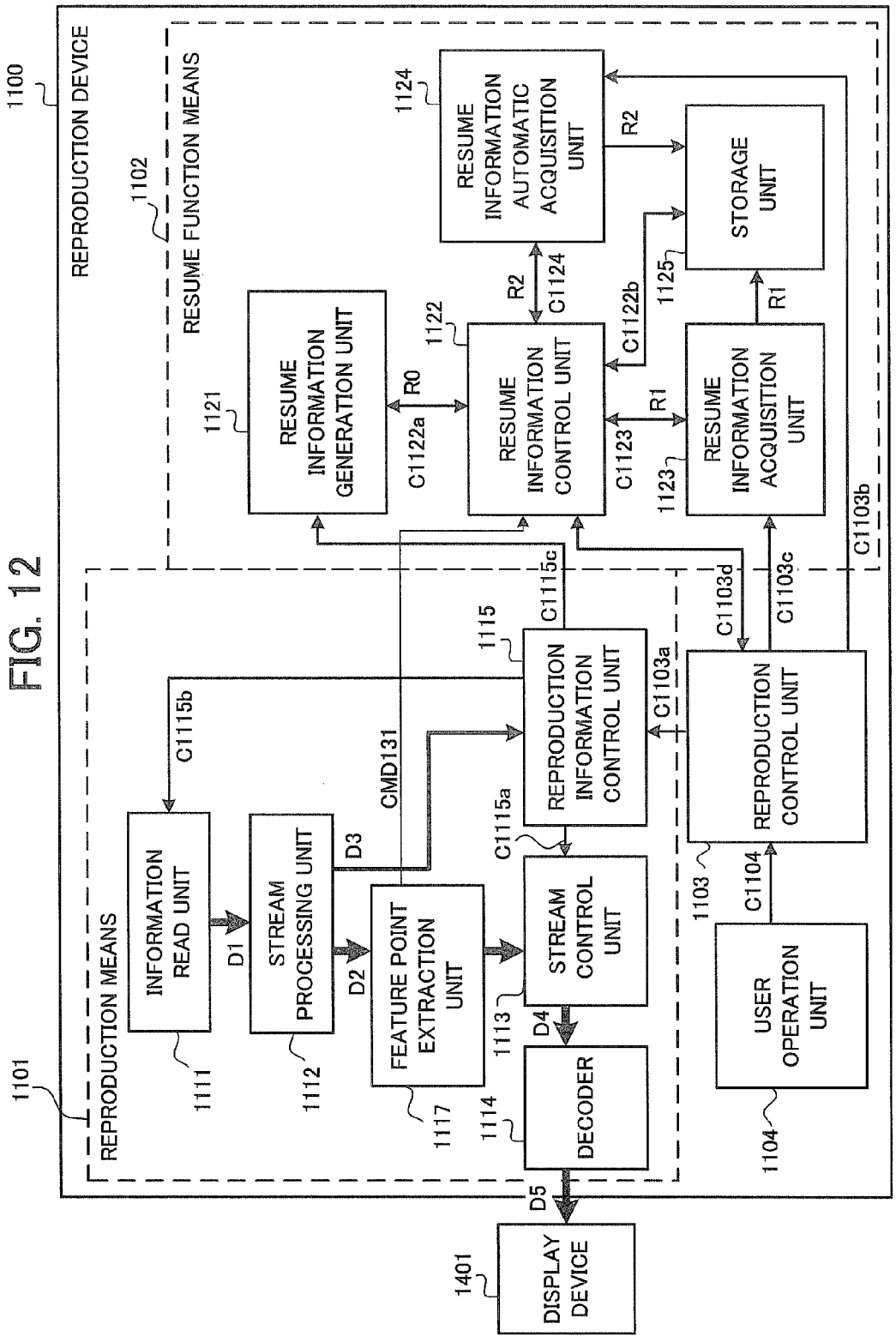
FIG. 12 is a block diagram schematically showing the structure of a reproduction device according to a fourth embodiment of the invention.

FIG. 12 is a block diagram schematically showing the structure of the reproduction device 1100 according to the fourth embodiment of the invention. As shown in FIG. 12, the reproduction device 1100 in the fourth embodiment includes a reproduction means 1101 for reproducing a video and/or audio (audio-video) signal, a resume function means 1102 for managing the reproduction start position in resume reproduction, a reproduction control unit 1103 that controls the reproduction means 1101 and resume function means 1102, and a user operation unit 1104 on which user commands are entered. A display device 1401 is connected to the reproduction device 1100. The reproduction device 1100 may be, for example, an optical disc reproduction device, a hard disk reproduction device, or a personal computer. The display device 1401 may be built into the reproduction device 1100.

As shown in FIG. 12, the reproduction means 1101 includes an information read unit 1111, a stream processing unit 1112, a stream control unit 1113, a decoder 1114, a reproduction information control unit 1115, and a feature point extraction unit 1117. As also shown in FIG. 12, the resume function means 1102 includes a resume information generation unit 1121, a resume information control unit 1122, a resume information acquisition unit 1123 that functions as the first resume information acquisition means, a resume information automatic acquisition unit 1124 that functions as the second resume information acquisition means, and a storage unit 1125. The reproduction information control unit 1115, resume information control unit 1122, and reproduction control unit 1103 function as a control means for controlling the whole device.

The information read unit 1111 reads a stream (including an audio-video signal and reproduction control information) D1 from an information recording medium (not shown) and outputs it to the stream processing unit 1112. The information recording medium is, for example, an optical disc or a hard disk. The information read unit 1111 is, for example, an optical disc reproduction unit or a hard disk drive (HDD). The information read unit 1111 may also be a means for outputting a stream input from an external source.

The stream processing unit 1112 outputs the audio-video signal D2 included in the stream D1 received from the information read unit 1111 to the feature point extraction unit 1117 and outputs the reproduction control information D3 to the reproduction information control unit 115. The feature point extraction unit 1117 outputs the audio-video signal D2 to the stream control unit 113.

The feature point extraction unit 1117 analyzes the audio-video data supplied from the stream processing unit 1112 and makes a resume information acquisition request concerning a position where a scene change is recognized to the resume information control unit 1122 by a command (CMD131).

The reproduction information control unit 1115 analyzes the reproduction control information D3 received from the information read unit 1111 and outputs control commands C1115a, C1115b. When it receives from the reproduction control unit 1103 a control command C1103a that requests an action (event) such as play, stop, fast motion, reverse motion, slow motion, pause, fast forward, or rewind, for example, the reproduction information control unit 1115 outputs a control command C1115a to the stream control unit 1113 on the basis of the reproduction control information D3.

The stream control unit 1113 controls operations to transfer a stream D4 to the decoder 1114 in accordance with the control command C115a from the reproduction information control unit 1115.

The decoder 1114 decodes the stream D4 from the stream control unit 1113 and supplies the display device 1401 with a decoded audio-video signal D5.

The resume information generation unit 1121 generates resume information R0 on the basis of a control command C1115c from the reproduction information control unit 1115. The resume information generation unit 1121 generates resume information that is needed to resume reproduction. The resume information includes, for example, time information, title information, chapter information, player setting information, and disk setting information. Resume information R0 includes first resume information R1 indicating the reproduction stop operation position at a moment when the user operation unit 1104 gives a command that stops reproduction and one or more items of second resume information R2 indicating a reproduction position at one or more moments of switching of reproduction operation type, moments of switching of reproduced information, or moments spaced at regular reproduction time intervals. The switching of reproduction operation type includes the switching among a plurality of actions, which include play, stop, fast motion, reverse motion, slow motion, and pause. The switching of reproduced information includes, for example, a change of title, a change of chapter, a change of GOP information, a change of angle (the angle in multi-angle content which allows a user operation to be made to view a video image taken from a desired angle), and a change between the showing and hiding of a picture-in-picture (PIP).

The reproduction control unit 1103 outputs control commands C1103a, C1103b, C1103c, C1103d to corresponding modules. When the reproduction control unit 1103 receives a control command C1104 that stops reproduction, from the user operation unit 1104, it outputs control commands to stop reproduction. When the reproduction control unit 1103 receives a control command C1104 to resume reproduction from the user operation unit 1104, it has the reproduction means 1101 restart reproduction from either the reproduction stop operation position indicated by the first resume information R1 or one of the reproduction positions indicated by the one or more items of second resume information R2. The selection of the position from which to restart reproduction will be described later, but among the reproduction stop operation position indicated by the first resume information and the reproduction positions indicated by the second resume information, the reproduction control unit may be configured to restart reproduction from, for example, the position based on the resume information generated last.

The user operation unit 1104 includes a remote control (not shown) for sending infrared signals, radio signals, or other types of command signals, and a user operation control unit (not shown) for receiving the command signals from the remote control and sending control commands corresponding to the received control signals to the reproduction control unit 1103. Alternatively, the user operation unit 1104 may be an operation unit built into the main body of the reproduction device 1100.

The resume information acquisition unit 1123 acquires the first resume information R1, indicating reproduction stop operation positions, from the resume information generation unit 1121 and stores it in the storage unit 1125. These reproduction stop operation positions may be set to include both the reproduction stop operation position when the user operation unit 1104 issues a reproduction stop command and the reproduction stop position when reproduction is stopped by the turning off of system power.

When it receives from the reproduction control unit 1103 a control command C1103c requiring the acquisition of resume information, the resume information acquisition unit 1123 outputs a control command C1123 to the resume information control unit 1122, requesting resume information acquisition. In the fourth embodiment, the resume information acquisition unit 1123 acquires first resume information R1 indicating the reproduction stop operation position when a given operation such as a user operation that stops reproduction (including an operation that stops reproduction by turning off system power) is made and stores the information in the storage unit 1125.

When it receives from the reproduction control unit 1103 a control command 1103b requiring the acquisition of resume information, the resume information automatic acquisition unit 1124 outputs a control command C1124 to the resume information control unit 1122, requesting resume information acquisition. In the fourth embodiment, the resume information automatic acquisition unit 1124 acquires one or more items of second resume information R2 indicating a reproduction position at one or more moments of switching of reproduction operation type, moments of switching of reproduced information (such as the title or chapter), or moments spaced at regular reproduction time intervals, and stores the information in the storage unit 1125. For example, the resume information automatic acquisition unit 1124 monitors reproduction control information sent from the reproduction control unit 1103, and when there is a change between different types of reproduction operation such as play, stop, fast motion, reverse motion, slow motion, and pause, when the reproduced information such as the chapter or title changes, or when the elapse of time changes from one state to another (at regular intervals of time, for example), second resume information R2 is automatically acquired from the resume information generation unit 1121 and stored in the storage unit 1125. Second resume information R2 acquired by the resume information automatic acquisition unit 1124 is stored in the storage unit 1125 with an assigned resume information number.

When the resume information acquisition unit 1123 issues a control command C1123 requesting resume information acquisition or when the resume information automatic acquisition unit 1124 issues a control command C1124 requesting resume information acquisition, the resume information control unit 1122 sends a control command C1122a requesting resume information acquisition to the resume information generation unit 1121, acquires the requested resume information (first resume information R1 or second resume information R2), and supplies the information to the resume information acquisition unit 1123 or resume information automatic acquisition unit 1124. Alternatively, when the feature point extraction unit 1117 issues a control command CMD131 requesting resume information acquisition, the resume information control unit gets the resume information from the resume information generation unit 1121. When it receives from the reproduction control unit 1103 a control command C1103d requesting the acquisition of resume reproduction information, the resume information control unit 1122 gets the resume information (first resume information R1 or second resume information R2) from the storage unit 1125 and sends the information to the reproduction control unit 1103.

The operation of the reproduction device 100 according to the fourth embodiment will now be described. First, the user inputs a reproduction start command by operating the play button (not shown) of the user operation unit 1104. In response to the input reproduction start command, the user operation unit 1104 outputs a control command C1104 to start reproduction to the reproduction control unit 1103, and the reproduction control unit 1103 sends control commands to the reproduction means 1101 and the resume function means 1102 in order to control their operation.

First, operation in normal reproduction will be described. In normal reproduction, the reproduction information control unit 1115 sends the information read unit 1111 a control command C1115b to read data, and the information read unit 1111 sends a stream D1 to the stream processing unit 1112. The stream processing unit 1112 receives the stream D1, sends an audio-video signal D2 to the stream control unit 1113 and sends reproduction control information D3 to the reproduction information control unit 1115. On the basis of the reproduction control information D3, the reproduction information control unit 1115 sends control commands C1115a needed for reproduction to the stream control unit 1113. The stream control unit 1113 controls operations that transfer the stream to the decoder 1114. The decoder 1114 decodes the input stream D4 and sends an audio-video signal D5 to the display device 1401; the display device 1401 displays video, and a speaker (not shown) outputs sound.

Operation in resumed reproduction will now be described. When an operation to start reproduction is made from the user operation unit 1104 while reproduction is suspended, the user operation unit 1104 sends a reproduction control command C1104 to the reproduction control unit 1103. The reproduction control unit 1103 sends the resume information control unit 1122 a control command C1103d to acquire resume information. The resume information control unit 1122 sends the storage unit 1125 a control command C1122b in accordance with the received control command C1103d to acquire resume information, and gets resume information (first resume information R1 or second resume information R2) from the storage unit 1125.

The reproduction control unit 1103 sends the reproduction information control unit 1115 a control command C1103a to resume reproduction in accordance with the resume information read from the storage unit 1125. The reproduction information control unit 1115 sends the information read unit 1111 a control command C1115b to output the stream from a reproduction start position based on the resume information. The information read unit 1111 sends the stream processing unit 1112 the stream D1 from the reproduction start position based on the resume information.

The stream processing unit 1112 sends the audio-video signal D2 to the stream control unit 1113 and reproduction control information D3 to the reproduction information control unit 1115. On the basis of the reproduction control information D3, the reproduction information control unit 1115 sends the stream control unit 1113 a control command C1115a including data needed to resume reproduction. The stream control unit 1113 controls the transfer of the stream D4 to the decoder 1114. The decoder 1114 sends a decoded audio-video signal D5 to the display device 1401. The display device 1401 displays video based on the decoded video signal.

Figure 13:
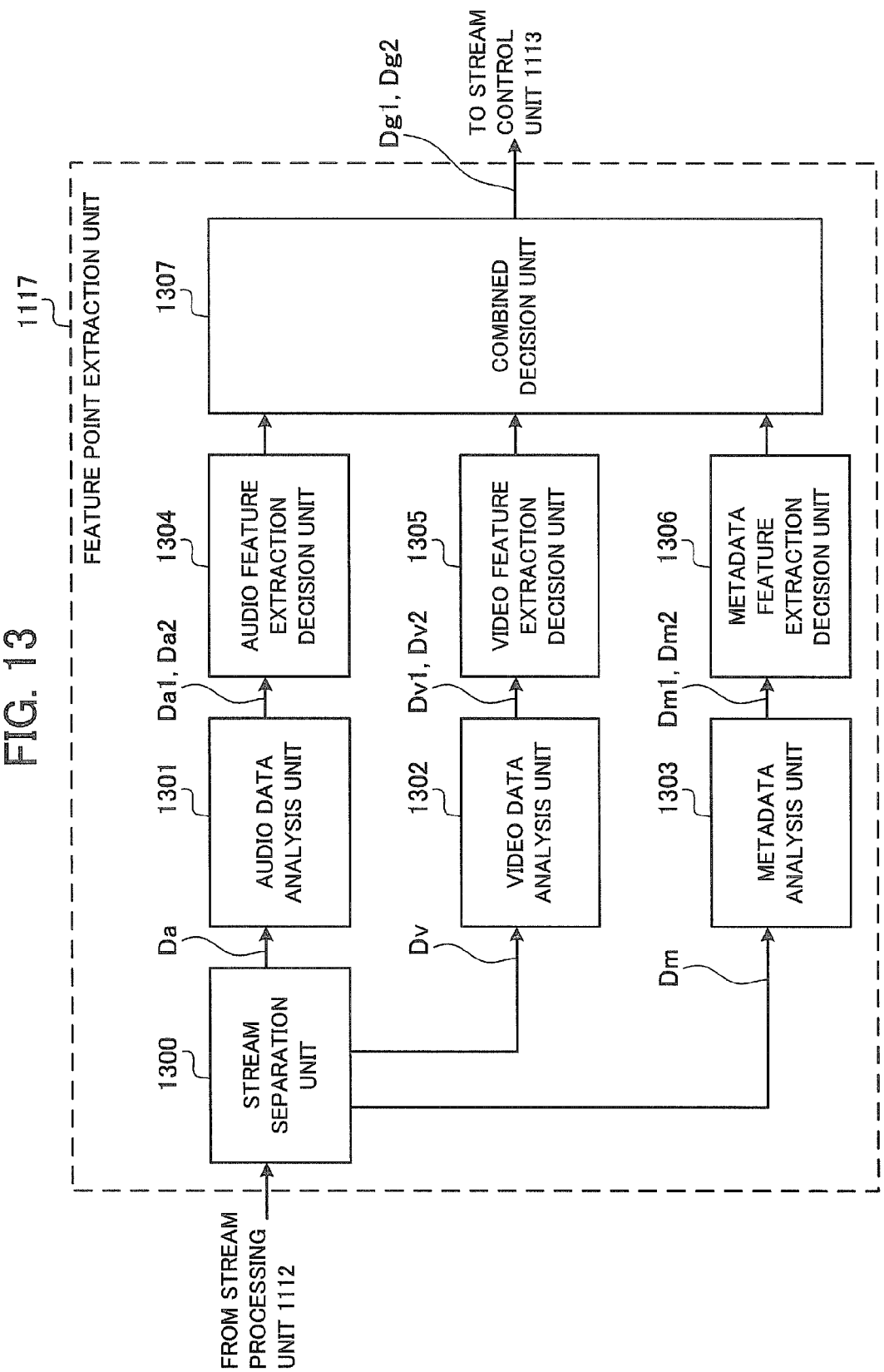
FIG. 13 is a block diagram of the feature point extraction unit in the fourth embodiment.

FIG. 13 shows an example of the structure of the feature point extraction unit 1117 in FIG. 12. The illustrated feature point extraction unit 1117 includes a stream separation unit 1300, an audio data analysis unit 1301, a video data analysis unit 1302, a metadata analysis unit 1303, an audio feature extraction decision unit 1304, a video feature extraction decision unit 1305, a metadata feature extraction decision unit 1306, and a combined decision unit 1307.

The stream separation unit 1300 separates the stream data sent from the stream processing unit 1112 into an audio-signal Da, a video signal Dv, and metadata Dm and sends them to the corresponding analyzers.

The audio data analysis unit 1301 analyzes audio data Da received from the stream separation unit 1300, extracts silence and sound volume feature points, and sends extracted information Da1 and time information Da2 to the audio feature extraction decision unit 1304.

The sound analysis method carried out by the stream separation unit 1300 will now be described. Concerning silence information and sound volume information (information indicating whether a given value is exceeded, information indicating whether a given value is not exceeded), the audio energy of a single audio frame can be obtained by acquiring MDCT coefficient values through an audio encoder and calculating a sum of squares of the MDCT coefficient values. The silence detection method may define silence as a state in which the detection of audio energy equal to or less than a given small value (threshold) continues for a given interval, and may evaluate the input audio data accordingly; the sound volume detection method may operate on the basis of the sum of the squares of the MDCT coefficient values (by deciding whether the sum exceeds a given value or is less than a given value).

Any other method that can determine the occurrence of silence and the duration of silence may be used. Any other method that can determine sound volume and its duration may be used.

The video data analysis unit 1302 analyzes the video data Dv sent from the stream separation unit 1300, extracts video feature points, and sends the extracted information Dv1 and time information Dv2 to the video feature extraction decision unit 1305.

The video analysis method carried out by the video data analysis unit 1302 will now be described. A histogram of the luminance component Y and chrominance components U, V, for example, may be generated from the input video data Dv. Instead of a method that generates a histogram of the luminance component Y and chrominance components U, V, any video analysis method, such as a method that generates a histogram of just the luminance component Y, may be used, provided the method allows video data to be analyzed and results of analysis to be compared.

The metadata analysis unit 1303 analyzes the metadata Dm (such as subtitle information, chapter information, and cast information) sent from the stream separation unit 1300, extracts points of switching of the metadata, and sends the extracted information Dm1 and time information Dm2 to the metadata feature extraction decision unit 1306.

The audio feature extraction decision unit 1304 compares a feature point sent from the audio data analysis unit 1301 with the preceding feature point, and if these feature points are the same, decides which feature point to accept in accordance with a given temporal threshold and/or volume threshold; it also sends audio data feature points and time information to the combined decision unit 1307.

The video feature extraction decision unit 1305 compares a feature point sent from the video data analysis unit 1302 with the preceding feature point, and if the feature points are the same, decides which feature point to accept in accordance with a given temporal threshold and/or the degree of video change; it also sends video data feature points and time information to the combined decision unit 1307.

The metadata feature extraction decision unit 1306 compares each feature point sent from the metadata analysis unit 1303 with the preceding feature point, and if the feature points are the same, decides which feature point to accept in accordance with a given temporal threshold and/or the degree of change in the metadata; it also sends metadata feature points and time information to the combined decision unit 1307.

Referring to the feature point information and time information sent from the audio feature extraction decision unit 1304, video feature extraction decision unit 1305, and metadata feature extraction decision unit 1306, the combined decision unit 1307 outputs feature extraction information Dg1 and feature extraction point time information Dg2 from the feature point extraction unit 1117. The combined decision unit 1307 can be set to give priority to feature point information extracted from audio data, video data, or metadata. Other settings can also be made, such as a setting to extract points where two types of feature extraction data agree, or points where three types of feature extraction data agree.

Figures 14, 15:
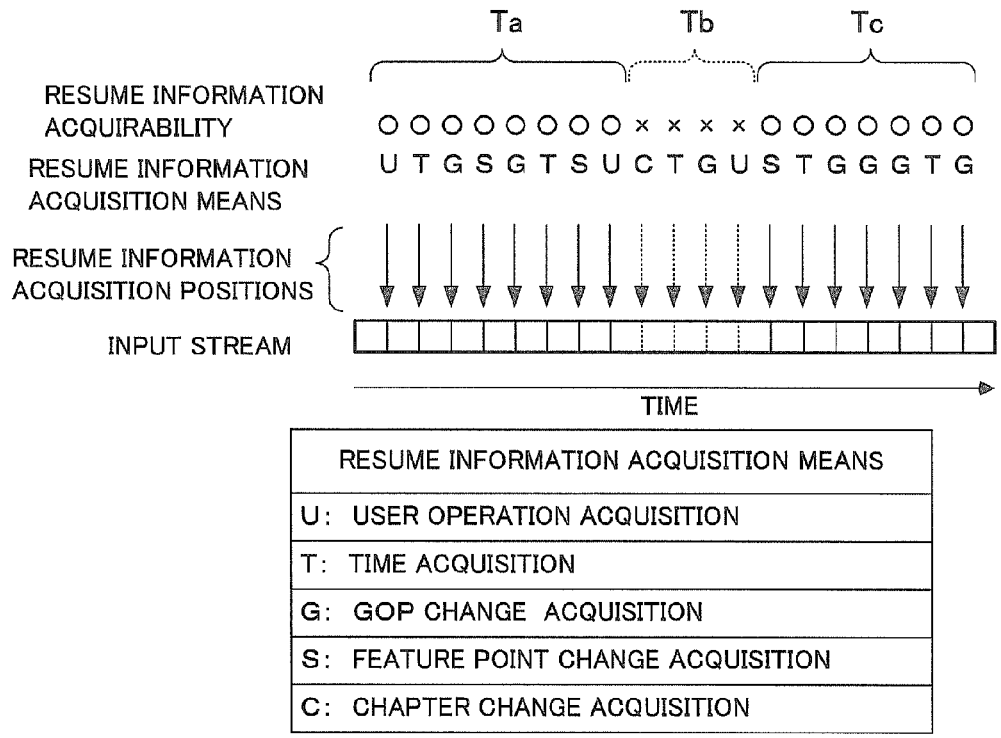
FIG. 14 shows an example of the automatic acquisition of resume information in the reproduction device according to the fourth embodiment.
FIG. 15 shows exemplary data recorded in the resume information recording unit in the fourth embodiment.

FIG. 14 shows an example of resume information acquisition. The methods by which resume information is acquired from the input stream are indicated by reference characters U, T, G, S, and C. When automatic resume information acquisition from the input stream is attempted, resume information can be acquired in intervals Ta and Tc but may not be acquirable in interval Tb. Among the various factors that may prevent resume information acquisition in interval Tb, it is assumed here that the DVD video disc does not allow the user to make an operation that resumes reproduction in interval Tb.

While this type of stream is being reproduced, if stop processing, for example, occurs in interval Ta or Tc, resume information can be acquired, but if stop processing occurs in interval Tb, resume information cannot be acquired. When resume information cannot be acquired (interval Tb), even if resume reproduction is requested, reproduction from the stop position is impossible because there is no resume information.

If resume information has been acquired automatically, however, resume information at the end of interval Ta is recorded, and in resume reproduction, reproduction can start from the end of interval Ta.

Since the means (method) of acquiring the resume information is recorded, video, audio, or metadata feature points significant for the user can be specified as resume information.

The method of recording the acquired resume information will now be described. Unlike the conventional resume information recording method, this method records multiple items of resume information and reserves resume information recording space according to given rules. For example, $2^n$ areas may be reserved for smooth access to memory, and resume information may be recorded in a ring buffer in order to reduce the resume information recording space.

Resume information may be recorded in either volatile memory or non-volatile memory. If the resume information is recorded in volatile memory, a backup power supply or the like should be provided as a provision against sudden power failures, or alternatively, enough power should be stored to enable recording in a non-volatile memory if the supply of power is interrupted, so that the resume information can be recorded in the non-volatile memory in the event of a sudden power failure.

Data recorded by the storage unit 1125 will be described with reference to FIG. 15. Formerly, a single item of resume information was recorded, and no resume numbers were needed; in automatic acquisition, however, since multiple items of resume information are recorded, resume numbers are needed for use as management numbers, and information indicating the resume information acquisition means (acquisition method) is necessary.

The title number, chapter number, and time information, which are needed to resume reproduction, are also recorded. Although not shown in the drawing, information about player settings in effect during reproduction, disc setting information, and so on may also be recorded.

Figure 16:
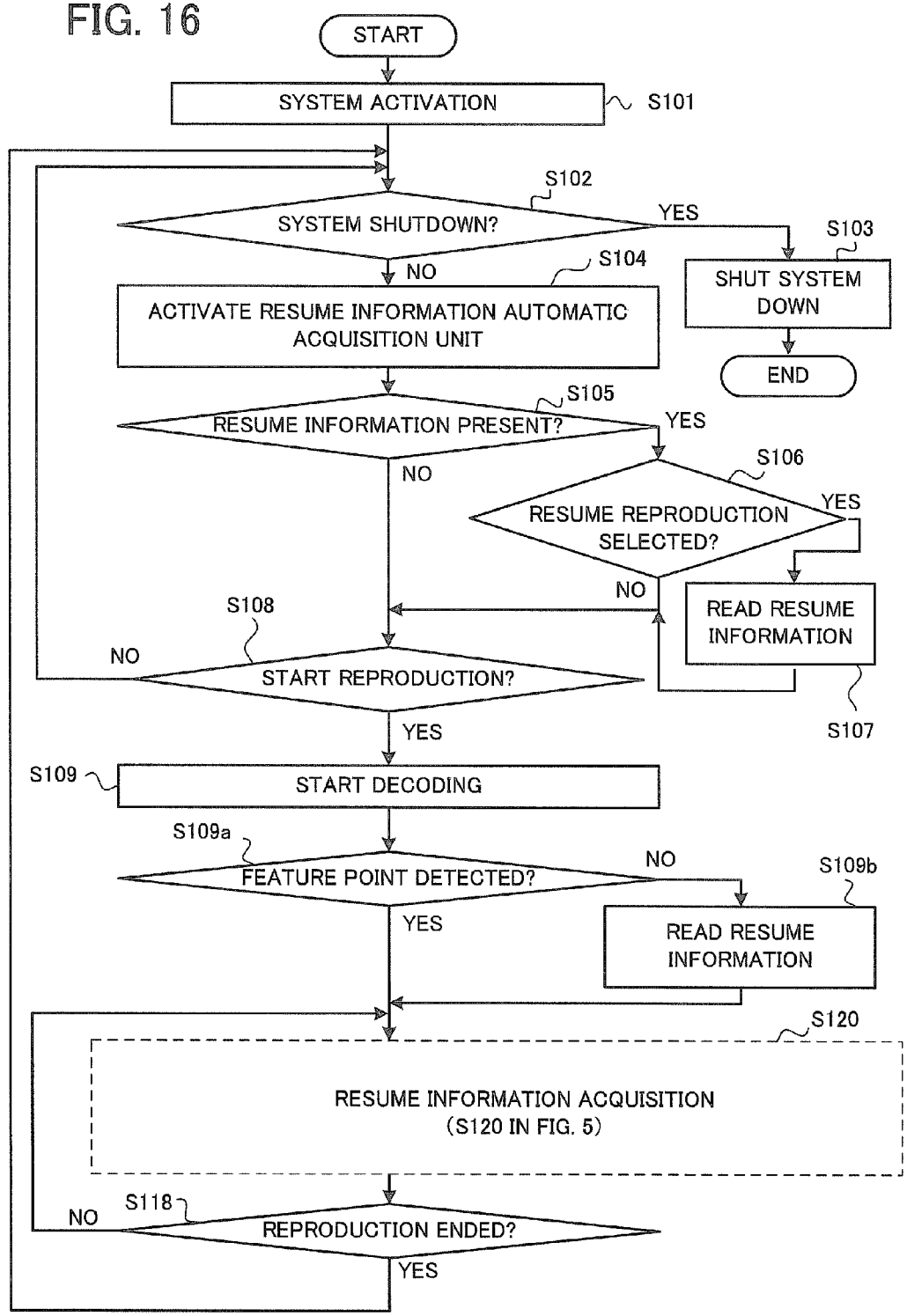
FIG. 16 is a flowchart illustrating the operation of the fourth embodiment.

FIG. 16 is a flowchart schematically illustrating the operation of the reproduction device 1100 according to the fourth embodiment (the reproduction method according to the fourth embodiment). When the reproduction device 1100 (also referred to as 'the system') is powered on, the system is activated (step S101). After the system is activated, the reproduction control unit 1103 checks whether system power has been turned off (also referred to as 'system shutdown') (step S102), and if there is a system shutdown request(power off operation), processing to shut the system down is performed (step S103). If there is no request to shut the system down when system shutdown is checked (step S102), the reproduction control unit 1103 activates the resume information automatic acquisition function carried out by the resume information automatic acquisition unit 1124 (step S104). Alternatively, the resume information automatic acquisition function may be activated when reproduction starts.

Operating through the resume information control unit 1122, the reproduction control unit 1103 checks to determine whether there is resume information in the storage unit 1125 (step S105). If there is resume information, the reproduction control unit 1103 checks whether or not to resume reproduction (step S106), and if resume reproduction is selected, reads the resume information from the storage unit 1125 through the resume information control unit 1122 (step S107). If there is resume information in the storage unit 1125, the reproduction control unit 1103 starts reproduction by the resume function; if there is no resume information, normal reproduction starts (step S108). Next the reproduction control unit 1103 has the reproduction means 1101 start decoding processing (step S109). Feature points are then extracted (step S109a), resume information is acquired if a feature point is detected (step S109b), and an audio-video signal D5 is output.

The resume function means 1102 executes processing to acquire resume information until reproduction ends (step S120). Since the processing in step S120 is the same as in the resume information acquisition step S120 in FIG. 5, the following description will refer to FIG. 5. When reproduction ends, the reproduction control unit 1103 returns the process to step S102 (step S118).

In the processing to acquire resume information (step S120), the resume function means 1102 advances the process to step S111 if a user operation has been made (step S110), and to step S114 if no such user operation has been made (step S110). In step S111, the resume information control unit 1122 decides whether the user operation is an operation for which resume information must be acquired. An operation for which resume information must be acquired is an operation that stops reproduction (including processing to stop reproduction by turning off system power) or the like. If it is decided in step S111 that the user operation is an operation for which resume information must be acquired, the reproduction control unit 1103 has the resume information control unit 1122 in the resume function means 1102 acquire first resume information R1 (step S112). If the system is set so that resume information is acquired at every user operation, the resume information control unit 1122 has the resume information control unit 1122 acquire resume information each time a user operation is made. After the resume information is acquired (step S112) or if the operation is not an operation for which resume information must be acquired (step S111), then after the user operation is executed (step S113), the resume information control unit 1122 advances the process to step S114.

In step S114, the resume information control unit 1122 checks whether the stream state has changed. If a stream state change has occurred, the resume information control unit 1122 advances the process to step S115. If a setting has been made not to acquire a resume information when the stream state changes, the resume information control unit 1122 advances the process to step S116. These stream state changes refer to a change of GOP, a change of chapter, a change of title, and so on. The stream state changes may also include the addition of an angle, a change between the showing and hiding of a PIP, and other such changes.

In step S116, when a specified period of time has elapsed, the resume information control unit 1122 has the resume information automatic acquisition unit 1124 execute processing to acquire resume information automatically (steps S116, S117). After resume information is acquired (step S117) or if the specified period of time has not elapsed (step S116), the resume information control unit 122 decides whether reproduction has ended (step S118) and continues the resume information acquisition process (step S120) until reproduction ends. If it is decided in step S118 that reproduction has ended, the reproduction control unit 1103 returns the process to step S102.

As described above, when reproduction resumes, the reproduction device 1100 and reproduction method according to the fourth embodiment allow reproduction to restart from the reproduction stop operation position or, even if reproduction cannot be restarted from the reproduction stop operation position, allow reproduction to restart from a position based on the second resume information R2 stored in the storage unit 1125. Accordingly, even when reproduction cannot be restarted from the reproduction stop operation position, there is a pseudo-resume function that can restart reproduction in a way that provides the user with the same level of convenience as the resume function that restarts reproduction from the reproduction stop operation position.

Just resume information significant for the user may be recorded by using the feature point extraction unit 1117 alone, without using the resume information automatic acquisition unit 1124.

With the additional feature point extraction unit 1117, multiple positions that can be resume reproduction start positions (resume points) can be detected automatically, and information for each resume point can be automatically collected and stored; furthermore, the number of times resume information is recorded can be reduced, and the number of times memory is accessed can be reduced.

Resume information indicating multiple resume points and settings to be used in resume reproduction is recorded in the storage unit 1125, and by use of the resume information, reproduction can restart from a resumable position.

With the additional resume information automatic acquisition unit 1124, multiple items of resume information can be acquired automatically. With the additional storage unit 1125, parameters such as the intervals of time at which resume information is automatically acquired may be selectable by the user.

Since multiple items of resume information (information for multiple resume points) are stored in the storage unit 1125, the user can select a resume reproduction position from the multiple items of acquired resume information.

Since the resume information acquisition unit 1123 automatically acquires resume information from reproduced intervals, the resume function can start reproduction even from a place where the user has not made an operation to resume reproduction or a place where reproduction was not suspended.

The information read unit 1111 is located in the reproduction device 1100, which has the resume function in the fourth embodiment, but the information read unit 1111 may be external to that device, provided it can transmit video, audio, and control data to the stream processing unit 1112.

Fifth Embodiment

Figure 17:
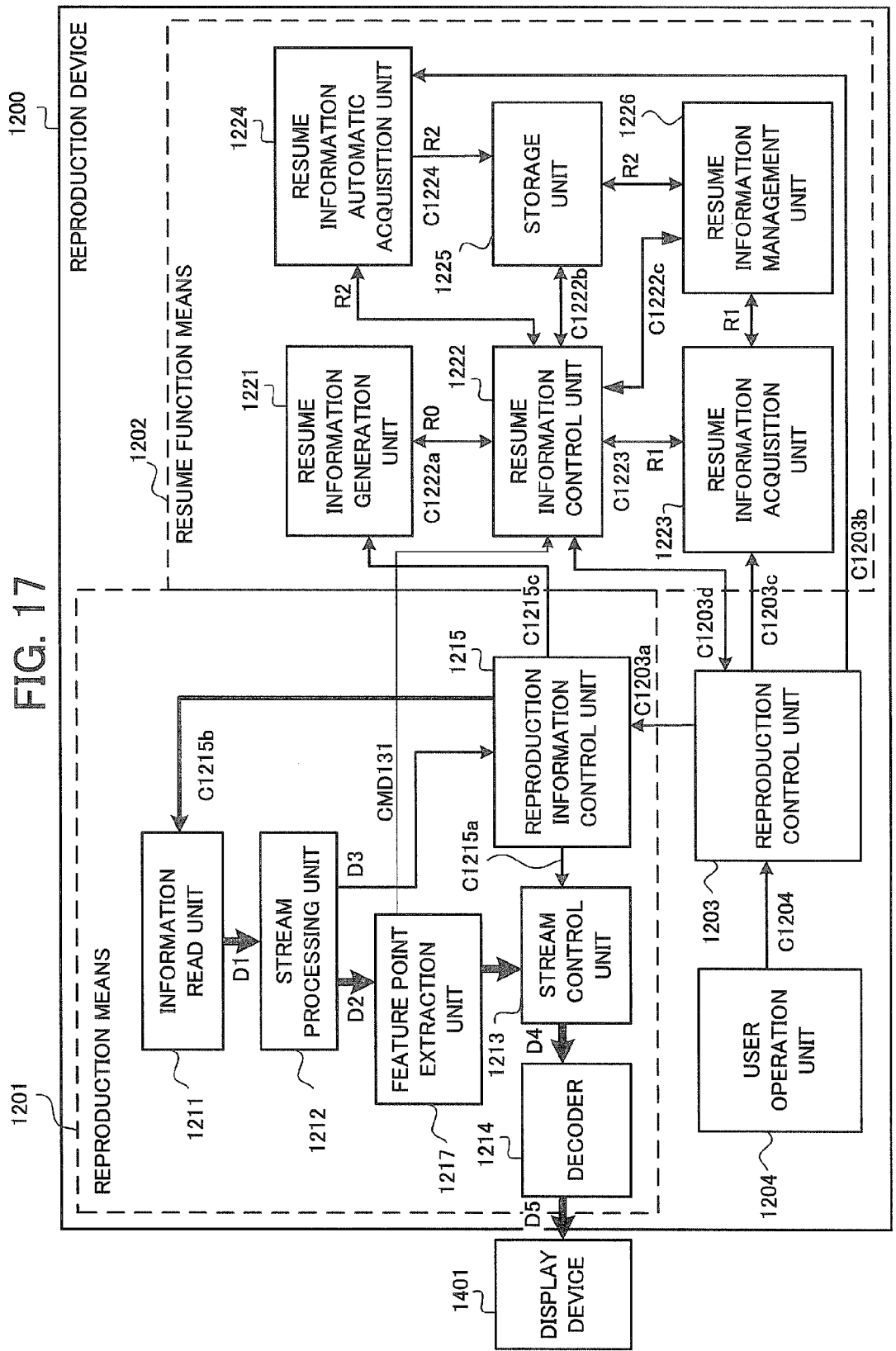
FIG. 17 is a block diagram schematically showing the structure of a reproduction device according to a fifth embodiment of the invention.

FIG. 17 is a block diagram schematically showing the structure of a reproduction unit 1200 according to a fifth embodiment of the invention. As shown in FIG. 17, the reproduction unit 1200 in the fifth embodiment includes a reproduction means 1201 for reproducing an audio-video signal, a resume function means 1202 for managing the reproduction start position in resume reproduction, a reproduction control unit 1203 that controls the reproduction means 1201 and resume function means 1202, and a user operation unit 1204 on which user commands are entered. A display device 1401 is connected to the reproduction unit 1200.

As shown in FIG. 17, the reproduction means 1201 includes an information read unit 1211, a stream processing unit 1212, a stream control unit 1213, a decoder 1214, a reproduction information control unit 1215, and a feature point extraction unit 1217. The resume function means 1202 includes a resume information generation unit 1221, a resume information control unit 1222, a resume information acquisition unit 1223 that functions as the first resume information acquisition means, a resume information automatic acquisition unit 1224 that functions as the second resume information acquisition means, a storage unit 1225, and a resume information management unit 1226.

The reproduction unit 1200 in the fifth embodiment differs from the reproduction device 1100 in the fourth embodiment by the presence of the resume information management unit 1226 in the resume function means 1202. The reproduction means 1201, reproduction control unit 1203, and user operation unit 1204 in the fifth embodiment have the same functions as the reproduction means 1101, reproduction control, unit 1103, and user operation unit 1104 in the fourth embodiment. Control commands C1203a to C1203d, C1204, and C1215a to C1215c in FIG. 17 are equivalent to control commands C1103a to C1103d, C1104, and C1115a to C1115c described earlier with reference to FIG. 12.

The resume information generation unit 1221, resume information control unit 1222, resume information acquisition unit 1223, resume information automatic acquisition unit 1224, and storage unit 1225 in the fifth embodiment have the same functions as the resume information generation unit 1121, resume information control unit 1122, resume information acquisition unit 1123, resume information automatic acquisition unit 1124, and storage unit 1125 in the fourth embodiment. Control commands C1222a, C1222b, C1223, and C1224 in FIG. 17 are equivalent to control commands C1122a, C1122b, C1123, and C1124 described earlier with reference to FIG. 12.

The resume information management unit 1126 manages the first resume information R1 acquired by the resume information acquisition unit 1223 and second resume information R2 acquired by the resume information automatic acquisition unit 1224. The resume information management unit 1126 arranges the resume information so that the user can select a desired item easily when reproduction resumes. The resume information management unit 1126 adds information such as type information indicating whether the resume information has been acquired automatically or by a user operation and information indicating positions where resume information could not be acquired (for example, a reproduction stop operation position when an operation that stopped reproduction was made in a non-resumable interval), to the resume information (first resume information R1 or second resume information R2). The resume information management unit 1126 may compare the first resume information R1 acquired by the resume information acquisition unit 1223 with the second resume information R2 stored in the storage unit 1225, and if there is a discrepancy, may perform a process that selectively combines the two types of resume information or selectively adds one to the other.

FIGS. 18A to 18D illustrate an exemplary method by which the resume information management unit 1126 manages resume information. Although the first resume information from the resume information acquisition unit 1223 includes just a single item of information, the resume information acquired by the resume information automatic acquisition unit 1224 and recorded in the storage unit 1225 includes two or more items. The resume information management unit 1126 compares these records and manages the optimal points from which to resume. In the illustrated example, there is a discrepancy between the resume information acquisition unit 1223 and the resume information recorded in the storage unit 1225. One possible cause is that for some reason the resume information acquisition unit 1223 could not acquire resume information after the reproduction time of 10:00, or circumstances did not permit the resume information to be acquired. In this case, the resume time acquired by the resume information acquisition unit 1223 is compared with the data in the storage unit 1225, and the data in the storage unit 1225 that were acquired within presumable times of reproduction can be used as resume information when reproduction resumes.

When an attempt is made to resume reproduction of a title, chapter, or the like for which resume reproduction is disallowed, given that there is no resume information, reproduction normally starts from the first play position (the preset reproduction start position designated by information accompanying the title, chapter, or the like for use when the title, chapter, or the like is reproduced), but the resume information management unit 1126 makes it possible to find a resumable point from which reproduction can pseudo-resume.

When resume information acquired when a specified period of time has elapsed is compared with resume information acquired in the resume information acquisition process carried out by the feature point extraction unit 1217, resume information acquired by the feature point extraction unit 1217 at a moment of a scene change, for example, would in many cases be more important for the user than resume information acquired at specified times or the like, so a management operation that honors the resume information of the feature point extraction unit 1217 is also carried out.

When reproduction restarts, from among the manual resume information, automatic resume information, and feature point resume information, the resume information management unit 1126 may automatically select the resume point stored most recently and the reproduction control unit 1203 may resume reproduction from the selected resume point.

As described above, when reproduction resumes, the reproduction unit 1200 and reproduction method according to the fifth embodiment allow reproduction to restart from the reproduction stop operation position or, even if reproduction cannot be restarted from the reproduction stop operation position, allow reproduction to restart from a position based on the second resume information R2 stored in the storage unit 1225. Accordingly, even when reproduction cannot be restarted from the reproduction stop operation position, there is a pseudo-resume function that can restart reproduction in a way that provides the user with the same level of convenience as the resume function that restarts reproduction from the reproduction stop operation position.

In the reproduction unit 1200 and reproduction method according to the fifth embodiment, in managing the resume information, the resume information management unit 1126 can distinguish between the first resume information R1 indicating a reproduction operation stop position acquired by a user operation and the second resume information R2 acquired by the resume information automatic acquisition unit 1224. The resume information can therefore be stored with a distinction between information indicating a resume reproduction position acquired by a user operation and information indicating an automatically acquired resume reproduction position. Accordingly, on the resume reproduction selection screen displayed on the display device 1401, additional information distinguishing between resume information acquired by a user operation and resume information acquired by the resume information automatic acquisition unit 1224 can be displayed. User operations can therefore be facilitated by displaying multiple items of acquired resume information on the display device 1401 and enabling one item of resume information to be selected as the resume reproduction start position by an operation performed on the user operation unit 1204.

For parts that have already been reproduced, the reproduction unit 1200 and reproduction method according to the fifth embodiment generate resume information automatically at regular intervals, so it is easy to tell what parts have not been reproduced (the unreproduced range) and what titles have not been watched.

When a reproduction stop operation position acquired by a user operation is in a non-resumable interval, reproduction would usually start from the first position of the content, but the reproduction unit 1200 according to the second embodiment acquires resume information automatically and can determine the reproduction start position on the basis of the automatically acquired resume information. If the entire main content constitutes a non-resumable interval, as in BD-J (Blue-ray Disc Java) content, for example, but reproduction is permitted to resume at positions where the title changes, in resume reproduction it becomes possible to start reproduction from a position where the title changes.

Regarding points other than the above, the fifth embodiment is the same as the fourth embodiment.

REFERENCE CHARACTERS

100, 200, 300, 1100, 1200 reproduction device, 101, 201, 301, 1101, 1201 reproduction means, 102, 202, 302, 1102, 1202 resume function means, 103, 203, 303, 1103, 1203 reproduction control unit, 104, 204, 304, 1104, 1204 user operation unit, 111, 211, 311, 1111, 1211 information read unit, 112, 212, 312, 1112, 1212 stream processing unit, 113, 213, 313, 1133, 1213 stream control unit, 114, 214, 314, 1144, 1214 decoder, 115, 215, 315, 1115, 1215 reproduction information control unit, 121, 221, 321, 1121, 1221 resume information generation unit, 122, 222, 322, 1122, 1222 resume information control unit, 123, 223, 323, 1123, 1223 resume information acquisition unit, 124, 224, 324, 1124, 1224 resume information automatic acquisition unit, 125, 225, 325, 1125, 1225 storage unit, 131 event reception unit, 132 time decision unit, 133 chapter information decision unit, 134 title information decision unit, 135 GOP information decision unit, 136 resume information temporary acquisition unit, 226, 326 resume information management unit, 308 power time management unit, 309 power supply unit, 401, 1401 display device, 1117, 1217 feature point extraction unit.

What is claimed is:

1. A reproduction device comprising:
    a reproduction unit that reproduces an audio-video signal;
    a user operation unit that inputs of commands by user operation;
    a resume function unit that manages reproduction start positions; and
    a control unit that controls the user operation unit and the resume function unit;
    wherein the resume function unit comprises:
    a first resume information generation and storage unit that generates and stores first resume information based at user operations as most recent, and
    a second resume information generation and storage unit that generates second resume information at regular reproduction time intervals by acquiring, each time an elapsed reproduction time reaches an integral multiple of a predetermined fixed time interval, information indicating a position of reproduction as the information indicating a resume point and stores it in the second resume information generation and storage unit, as the second resume information; and
    wherein the control unit is configured to select a position from among the positions indicated by the first resume information and the second resume information, and to cause the reproduction unit to restart reproduction from the selected position,
    if a reproduction stop operation position when an operation that stopped reproduction was made by the user operation unit in a non-resumable interval, in which resume information acquisition is not permitted, the control unit causes the reproduction unit to restart reproduction from a position based on the second resume information stored previously in the second resume information generation and storage unit, the position based on the second resume information being positioned immediately preceding the non-resumable interval.

2. The reproduction device of claim 1, wherein the user operation is operation for commanding switching of actions including play, stop, fast motion, reverse motion, slow motion, and pause.

3. The reproduction device of claim 1, wherein the second resume information includes one of a change of title, a change of chapter, a change of GOP information, a change of video capture camera angle, and a change between showing and hiding of a picture-in-picture.

4. The reproduction device of claim 1, wherein the unit that restarts reproduction restarts reproduction from the position based on the resume information generated last, among the reproduction stop operation position indicated by the first resume information and the reproduction stop positions indicated by the one or more items of the second resume information.

5. The reproduction device of claim 1, wherein the control unit comprises a unit that causes a display unit to display the position indicated by the first resume information and the positions indicated by the second resume information as possible reproduction restart positions and a unit that enables one position to be selected from the possible reproduction restart positions displayed on the display unit by an operation on the user operation unit; and
the control unit causes the reproduction unit to restart reproduction from the possible reproduction restart position selected with the user operation unit.

6. The reproduction device of claim 1, wherein the resume function unit comprises a resume information management unit that, when the first resume information agrees with any of the second resume information, selects the position indicated by the first resume information as the reproduction restart position.

7. The reproduction device of claim 1, further comprising a power time management unit that manages a time for which the reproduction device is powered on, wherein:
the resume function unit has a unit that excludes a position indicated by first resume information acquired at a preceding shutdown from the reproduction restart position when the power-on time is shorter than a given reference period.

8. A reproduction method in a reproduction device having a reproduction unit that reproduces an audio-video signal, a user operation unit that inputs of commands by user operation, a resume function unit that manages reproduction start positions, and a control unit that controls the user operation unit and the resume function unit, comprising:
a step of generating and storing first resume information based at user operations;
a step of generating second resume information at regular reproduction time intervals by acquiring, each time an elapsed reproduction time reaches an integral multiple of a predetermined fixed time interval, information indicating a position of reproduction as the information indicating a resume point and stores it in the second resume information generation and storage unit, as the second resume information;
a step of selecting a position from among the positions indicated by the first resume information and the second resume information, and causing the reproduction unit to restart reproduction from the selected position,
wherein if a reproduction stop operation position when an operation that stopped reproduction was made by the user operation unit in a non-resumable interval, in which resume information acquisition is not permitted, the control unit causes the reproduction unit to restart reproduction from a position based on the second resume information stored previously in the step of generating and storing the second resume information, the position based on the second resume information being positioned immediately preceding the non-resumable interval.

9. The reproduction method of claim 8, wherein the user operation is operation for commanding switching of actions including play, stop, fast motion, reverse motion, slow motion, and pause.

10. The reproduction method of claim 8, wherein the second resume information includes one of a change of title, a change of chapter, a change of GOP information, a change of video capture camera angle, and a change between showing and hiding of a picture-in-picture.

11. The reproduction method of claim 8, wherein the step of selecting a position includes causing reproduction to restart from a position based on the resume information generated last, among the reproduction stop operation position indicated by the first resume information and the reproduction positions indicated by the one or more items of the second resume information.

12. The reproduction method of claim 8, further comprising a step of causing a display unit to display the position indicated by the first resume information and the positions indicated by the second resume information as possible reproduction restart positions, wherein:
the step of selecting a position includes causing reproduction to restart from a position selected, by an operation performed on the user operation unit, from among the possible reproduction restart positions displayed on the display unit.

13. The reproduction method of claim 8, further comprising a step of, when the first resume information agrees with any of the second resume information, selecting the position indicated by the first resume information as the reproduction restart position.

14. The reproduction method of claim 8, further comprising a step of managing a time for which the reproduction device is powered on, wherein:
the step of selecting a position includes excluding a position indicated by first resume information acquired at a preceding shutdown from the reproduction restart position when the power-on time is shorter than a given reference period.

15. A reproduction device comprising:
a unit that reads audio-video data from a recording medium;
an audio-video reproduction unit that carries out reproduction processing of the audio-video data;
a resume information recording unit that stores information indicating a resume point and information related thereto as resume information;
a resume information acquisition unit that, when reproduction processing execution is suspended in response to a reproduction processing suspension command given by a user operation during the reproduction processing execution, acquires information indicating a point at which the reproduction processing was suspended as the information indicating a resume point, and stores it in the resume information recording unit, together with the information related thereto, as most recent manual resume information;
a unit that analyzes input video, audio, and metadata to detect feature points, acquiring information indicating positions where a feature point is present as the information indicating a resume point, and stores it in the resume information recording unit, together with the information related thereto, as most recent feature point resume information;

a unit that acquires, each time an elapsed reproduction time reaches an integral multiple of a predetermined fixed time interval, information indicating a position of reproduction as the information indicating a resume point and stores it in the resume information recording unit, together with the information related thereto, as most recent automatic resume information; and a unit that, when reproduction is restarted after being suspended, causes one of the most recent resume points included in the plural resume information stored in the resume information recording unit to be selected and causes reproduction to restart from the selected most recent resume point;

wherein if reproduction is suspended in a non-resumable interval in which the most recent manual resume information, the most recent feature point resume information and the most recent automatic resume information cannot be acquired, the unit that causes reproduction to restart causes reproduction to restart from the resume point included in the manual resume information or the feature point resume information or the automatic resume information that has been previously stored prior to the most recent manual resume information, the most recent feature point resume information and the most recent automatic resume information.

16. The reproduction device of claim 15, further comprising:

a management unit that, when reproduction restarts, automatically selects the resume information stored most recently from among the manual resume information, the automatic resume information, and the feature point resume information; and a unit that restarts reproduction from the resume point indicated by the selected resume information.

17. The reproduction device of claim 15, further comprising a unit that, when reproduction restarts, enables a desired item of resume information to be selected manually, from among plural manual resume information, plural automatic resume information, and resume information from plural feature extraction points, and restarts reproduction from the resume point indicated by the selected resume information.

18. The reproduction device of claim 15, wherein the resume information recording unit includes a volatile memory, and if supply of power to the volatile memory is interrupted, the resume information in the volatile memory is recorded in a non-volatile memory by use of a backup power supply.

19. A reproduction method carried out by a reproduction device having a resume information recording unit that stores information indicating a resume point and information related thereto as resume information, comprising:

a step of reading audio-video data from a recording medium;

an audio-video reproduction step of carrying out reproduction processing of the audio-video data;

a resume information acquisition step of, when reproduction processing execution is suspended in response to a reproduction processing suspension command given by a user operation during the reproduction processing execution, acquiring information indicating a point at which the reproduction processing was suspended as the information indicating a resume point and storing it in the resume information recording unit, together with the information related thereto, as most recent manual resume information;

a step of analyzing input video, audio, and metadata to detect feature points, acquiring information indicating a position where a feature point is present as the information indicating a resume point, and storing it in the resume information recording unit, together with the information related thereto, as most recent feature point resume information;

a step of acquiring, each time an elapsed reproduction time reaches an integral multiple of a predetermined fixed time interval, information indicating a position of reproduction as the information indicating a resume point and storing it in the resume information recording unit, together with the information related thereto, as most recent automatic resume information; and a step of, when reproduction is restarted after being suspended, causing one of the most recent resume points included in the plural resume information stored in the resume information recording unit to be selected and causing reproduction to restart from the selected most recent resume point;

wherein if reproduction is suspended in a non-resumable interval in which the most recent manual resume information, the most recent feature point resume information and the most recent automatic resume information cannot be acquired, the step of causing reproduction to restart causes reproduction to restart from the resume point included in the manual resume information or the feature point resume information or the automatic resume information that has been previously stored prior to the most recent manual resume information, the most recent feature point resume information and the most recent automatic resume information.

20. The reproduction method of claim 19, further comprising:

a management step of, when reproduction starts, automatically selecting the resume point stored most recently from among the manual resume information, automatic resume information, and feature point resume information; and a step of restarting reproduction from the resume point indicated by the selected resume information.

21. The reproduction method of claim 19, further comprising a step of, when reproduction restarts, enabling a desired item of resume information to be selected manually, from among plural manual resume information, plural automatic resume information, and resume information from plural feature extraction points, and restarting reproduction from the resume point indicated by the selected resume information.

22. The reproduction method of claim 19, wherein the resume information recording unit includes a volatile memory, and if supply of power to the volatile memory is interrupted, the resume information in the volatile memory is recorded in a non-volatile memory by use of a backup power supply.

* * * * *